(12) United States Patent
Maes et al.

(10) Patent No.: US 8,321,594 B2
(45) Date of Patent: Nov. 27, 2012

(54) ACHIEVING LOW LATENCIES ON NETWORK EVENTS IN A NON-REAL TIME PLATFORM

(75) Inventors: Stèphane H. Maes, Fremont, CA (US); Terje Strand, Redwood Shores, CA (US); Christo Tonev, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 39 days.

(21) Appl. No.: 11/951,500

(22) Filed: Dec. 6, 2007

(65) Prior Publication Data

US 2008/0235327 A1 Sep. 25, 2008

Related U.S. Application Data

(60) Provisional application No. 60/896,676, filed on Mar. 23, 2007.

(51) Int. Cl.
*G06F 15/16* (2006.01)

(52) U.S. Cl. .......................... 709/250; 719/328; 719/331

(58) Field of Classification Search .................. 719/328, 719/331; 709/250
See application file for complete search history.

(56) References Cited

U.S. PATENT DOCUMENTS

| 5,414,812 | A | 5/1995 | Filip et al. |
| 5,613,060 | A * | 3/1997 | Britton et al. .................. 714/15 |
| 5,699,513 | A | 12/1997 | Feigen et al. |
| 5,786,770 | A | 7/1998 | Thompson |
| 5,850,517 | A | 12/1998 | Verkler et al. |
| 5,867,665 | A | 2/1999 | Butman et al. |
| 5,946,634 | A | 8/1999 | Korpela |
| 6,115,690 | A | 9/2000 | Wong |
| 6,119,104 | A | 9/2000 | Brumbelow |
| 6,128,645 | A | 10/2000 | Butman et al. |
| 6,157,941 | A | 12/2000 | Verkler et al. |
| 6,163,800 | A | 12/2000 | Ejiri |
| 6,192,414 | B1 | 2/2001 | Horn |
| 6,230,271 | B1 | 5/2001 | Wadlow et al. |
| 6,272,556 | B1 * | 8/2001 | Gish .............................. 719/315 |

(Continued)

FOREIGN PATENT DOCUMENTS

EP  2 034 748 A1  3/2009

(Continued)

OTHER PUBLICATIONS

U.S. Appl. No. 11/024,160, filed Dec. 2004, Maes.

(Continued)

*Primary Examiner* — Kevin Bates
(74) *Attorney, Agent, or Firm* — Kilpatrick Townsend & Stockton LLP

(57) ABSTRACT

Embodiments of the invention provide systems and methods for providing low-latency handling of events and/or requesting actions of external resources in a real time environment while utilizing non-real time components. According to one embodiment, a system for providing low-latency handling of events in a real time environment while utilizing non-real time components can comprise an external resource and a resource adapter communicatively coupled with the external resource. The resource adapter can be adapted to detect events of the external resource and/or request actions of the external resource. The system can also include at least one local application communicatively coupled with the resource adapter. The local application can have a local interface and the local application can interact with the resource adapter via the local interface.

45 Claims, 12 Drawing Sheets

U.S. PATENT DOCUMENTS

| | | | | |
|---|---|---|---|---|
| 6,275,857 B1 | * | 8/2001 | McCartney | 709/226 |
| 6,336,138 B1 | | 1/2002 | Caswell et al. | |
| 6,374,305 B1 | | 4/2002 | Gupta et al. | |
| 6,466,984 B1 | | 10/2002 | Naveh et al. | |
| 6,496,864 B1 | * | 12/2002 | McCartney | 709/226 |
| 6,553,108 B1 | | 4/2003 | Felger | |
| 6,578,159 B1 | | 6/2003 | Kitagawa et al. | |
| 6,611,812 B2 | | 8/2003 | Hurtado et al. | |
| 6,748,570 B1 | | 6/2004 | Bahrs et al. | |
| 6,792,605 B1 | | 9/2004 | Roberts et al. | |
| 6,813,278 B1 | | 11/2004 | Swartz et al. | |
| 6,868,413 B1 | | 3/2005 | Grindrod et al. | |
| 6,978,348 B2 | | 12/2005 | Belknap et al. | |
| 6,985,939 B2 | | 1/2006 | Fletcher et al. | |
| 7,003,578 B2 | | 2/2006 | Kanada et al. | |
| 7,042,988 B2 | | 5/2006 | Juitt et al. | |
| 7,043,538 B2 | | 5/2006 | Guedalia et al. | |
| 7,073,055 B1 | | 7/2006 | Freed et al. | |
| 7,089,317 B2 | * | 8/2006 | Jeyaraman et al. | 709/230 |
| 7,111,060 B2 | | 9/2006 | Araujo et al. | |
| 7,114,146 B2 | | 9/2006 | Zhang et al. | |
| 7,114,148 B2 | | 9/2006 | Irving et al. | |
| 7,133,669 B2 | | 11/2006 | Nair et al. | |
| 7,143,094 B2 | | 11/2006 | Arroyo et al. | |
| 7,146,616 B2 | | 12/2006 | Dorner et al. | |
| 7,185,342 B1 | | 2/2007 | Carrer et al. | |
| 7,194,482 B2 | | 3/2007 | Larkin et al. | |
| 7,222,148 B2 | * | 5/2007 | Potter et al. | 709/201 |
| 7,222,334 B2 | | 5/2007 | Casati et al. | |
| 7,272,625 B1 | | 9/2007 | Hannel et al. | |
| 7,281,029 B2 | | 10/2007 | Rawat | |
| 7,295,532 B2 | | 11/2007 | Haller et al. | |
| 7,302,570 B2 | | 11/2007 | Beard et al. | |
| 7,340,508 B1 | | 3/2008 | Kasi et al. | |
| 7,409,707 B2 | | 8/2008 | Swander et al. | |
| 7,411,943 B2 | | 8/2008 | Kittredge et al. | |
| 7,415,010 B1 | | 8/2008 | Croak et al. | |
| 7,426,381 B2 | | 9/2008 | Maes | |
| 7,433,838 B2 | | 10/2008 | Welsh et al. | |
| 7,447,793 B2 | | 11/2008 | Morioka | |
| 7,454,399 B2 | | 11/2008 | Matichuk | |
| 7,461,062 B2 | | 12/2008 | Stewart et al. | |
| 7,472,349 B1 | | 12/2008 | Srivastava et al. | |
| 7,519,076 B2 | * | 4/2009 | Janssen et al. | 370/445 |
| 7,580,994 B1 | * | 8/2009 | Fiszman et al. | 709/223 |
| 7,617,521 B2 | | 11/2009 | Maes | |
| 7,630,953 B2 | | 12/2009 | Stauber et al. | |
| 7,676,813 B2 | | 3/2010 | Bisset et al. | |
| 7,716,310 B2 | | 5/2010 | Foti | |
| 7,752,634 B1 | | 7/2010 | Saxena et al. | |
| 7,779,445 B2 | | 8/2010 | Ellis | |
| 7,853,647 B2 | | 12/2010 | Maes | |
| 7,860,490 B2 | | 12/2010 | Maes | |
| 7,865,607 B2 | | 1/2011 | Sonalkar et al. | |
| 7,873,716 B2 | | 1/2011 | Maes | |
| 7,925,727 B2 | | 4/2011 | Sullivan et al. | |
| 8,023,971 B2 | | 9/2011 | Egli | |
| 8,032,920 B2 | | 10/2011 | Maes | |
| 8,068,860 B1 | | 11/2011 | Midkiff | |
| 8,073,810 B2 | | 12/2011 | Maes | |
| 8,090,848 B2 | | 1/2012 | Maes | |
| 8,161,171 B2 | | 4/2012 | Maes | |
| 8,214,503 B2 | | 7/2012 | Maes | |
| 2001/0028649 A1 | | 10/2001 | Pogossiants et al. | |
| 2002/0002684 A1 | | 1/2002 | Fox et al. | |
| 2002/0087674 A1 | | 7/2002 | Guilford et al. | |
| 2002/0099738 A1 | | 7/2002 | Grant | |
| 2002/0101879 A1 | | 8/2002 | Bouret | |
| 2002/0111848 A1 | | 8/2002 | White | |
| 2002/0143819 A1 | | 10/2002 | Han et al. | |
| 2002/0144119 A1 | | 10/2002 | Benatar | |
| 2002/0178122 A1 | | 11/2002 | Maes | |
| 2002/0184373 A1 | | 12/2002 | Maes | |
| 2002/0191774 A1 | | 12/2002 | Creamer et al. | |
| 2002/0194388 A1 | | 12/2002 | Boloker et al. | |
| 2002/0198719 A1 | | 12/2002 | Gergic et al. | |
| 2002/0198991 A1 | | 12/2002 | Gopalakrishnan et al. | |
| 2003/0003953 A1 | | 1/2003 | Houplain | |
| 2003/0004746 A1 | | 1/2003 | Kheirolomoom et al. | |
| 2003/0023953 A1 | | 1/2003 | Lucassen et al. | |
| 2003/0046316 A1 | | 3/2003 | Gergic et al. | |
| 2003/0061268 A1 | | 3/2003 | Moerdijk et al. | |
| 2003/0061404 A1 | | 3/2003 | Atwal et al. | |
| 2003/0115203 A1 | | 6/2003 | Brown et al. | |
| 2003/0115260 A1 | | 6/2003 | Edge | |
| 2003/0131076 A1 | | 7/2003 | Nelson et al. | |
| 2003/0140131 A1 | | 7/2003 | Chandrashekhar et al. | |
| 2003/0154233 A1 | | 8/2003 | Patterson | |
| 2003/0185233 A1 | | 10/2003 | Ji et al. | |
| 2003/0191769 A1 | | 10/2003 | Crisan et al. | |
| 2003/0208539 A1 | | 11/2003 | Gildenblat et al. | |
| 2003/0217044 A1 | | 11/2003 | Zhang et al. | |
| 2003/0229760 A1 | | 12/2003 | Doyle et al. | |
| 2003/0229812 A1 | | 12/2003 | Buchholz | |
| 2004/0015547 A1 | | 1/2004 | Griffin et al. | |
| 2004/0015578 A1 | | 1/2004 | Karakashian et al. | |
| 2004/0024720 A1 | | 2/2004 | Fairweather | |
| 2004/0064528 A1 | | 4/2004 | Meredith et al. | |
| 2004/0068586 A1 | | 4/2004 | Xie et al. | |
| 2004/0100923 A1 | | 5/2004 | Yam | |
| 2004/0110493 A1 | | 6/2004 | Alvarez et al. | |
| 2004/0125758 A1 | | 7/2004 | Hayduk | |
| 2004/0128546 A1 | | 7/2004 | Blakley et al. | |
| 2004/0139319 A1 | | 7/2004 | Favazza et al. | |
| 2004/0148334 A1 | | 7/2004 | Arellano et al. | |
| 2004/0153545 A1 | | 8/2004 | Pandya et al. | |
| 2004/0161090 A1 | | 8/2004 | Digate et al. | |
| 2004/0176988 A1 | | 9/2004 | Boughannam | |
| 2004/0221005 A1 | | 11/2004 | Albaugh et al. | |
| 2005/0015340 A1 | | 1/2005 | Maes | |
| 2005/0021670 A1 | | 1/2005 | Maes | |
| 2005/0050194 A1 | | 3/2005 | Honeisen et al. | |
| 2005/0054287 A1 | | 3/2005 | Kim | |
| 2005/0073982 A1 | | 4/2005 | Corneille et al. | |
| 2005/0075115 A1 | | 4/2005 | Corneille et al. | |
| 2005/0086197 A1 | | 4/2005 | Boubez et al. | |
| 2005/0086297 A1 | | 4/2005 | Hinks | |
| 2005/0091156 A1 | | 4/2005 | Hailwood et al. | |
| 2005/0125696 A1 | | 6/2005 | Afshar et al. | |
| 2005/0132086 A1 | | 6/2005 | Flurry et al. | |
| 2005/0144557 A1 | | 6/2005 | Li et al. | |
| 2005/0172027 A1 | | 8/2005 | Castellanos et al. | |
| 2005/0193269 A1 | | 9/2005 | Haswell et al. | |
| 2005/0228984 A1 | | 10/2005 | Edery et al. | |
| 2005/0239485 A1 | | 10/2005 | Kundu et al. | |
| 2005/0249190 A1 | * | 11/2005 | Birch | 370/352 |
| 2005/0249344 A1 | * | 11/2005 | Mueller et al. | 379/207.15 |
| 2005/0267979 A1 | | 12/2005 | Bailey | |
| 2006/0014688 A1 | | 1/2006 | Costa et al. | |
| 2006/0021010 A1 | | 1/2006 | Atkins et al. | |
| 2006/0031559 A1 | | 2/2006 | Sorokopud et al. | |
| 2006/0036689 A1 | | 2/2006 | Buford et al. | |
| 2006/0041669 A1 | | 2/2006 | Bemmel et al. | |
| 2006/0053227 A1 | | 3/2006 | Ye et al. | |
| 2006/0072474 A1 | | 4/2006 | Mitchell | |
| 2006/0080117 A1 | | 4/2006 | Carr et al. | |
| 2006/0104306 A1 | | 5/2006 | Adamczyk et al. | |
| 2006/0104431 A1 | | 5/2006 | Emery et al. | |
| 2006/0116912 A1 | | 6/2006 | Maes | |
| 2006/0117109 A1 | | 6/2006 | Maes | |
| 2006/0143686 A1 | | 6/2006 | Maes | |
| 2006/0164902 A1 | * | 7/2006 | Fung | 365/221 |
| 2006/0165060 A1 | | 7/2006 | Dua | |
| 2006/0178898 A1 | * | 8/2006 | Habibi | 705/1 |
| 2006/0190600 A1 | | 8/2006 | Blohm et al. | |
| 2006/0210033 A1 | | 9/2006 | Grech et al. | |
| 2006/0212574 A1 | | 9/2006 | Maes | |
| 2006/0229078 A1 | | 10/2006 | Itzkovitz et al. | |
| 2006/0256774 A1 | | 11/2006 | Rigaldies et al. | |
| 2006/0272028 A1 | | 11/2006 | Maes | |
| 2006/0282856 A1 | | 12/2006 | Errico et al. | |
| 2006/0291507 A1 | | 12/2006 | Sarosi et al. | |
| 2007/0005770 A1 | | 1/2007 | Kramer et al. | |
| 2007/0011191 A1 | | 1/2007 | Otokawa et al. | |
| 2007/0011322 A1 | * | 1/2007 | Moiso | 709/225 |
| 2007/0027975 A1 | | 2/2007 | Tai et al. | |
| 2007/0061397 A1 | | 3/2007 | Gregorat et al. | |

| | | | |
|---|---|---|---|
| 2007/0088836 A1 | 4/2007 | Tai et al. | |
| 2007/0100831 A1 | 5/2007 | Cox | |
| 2007/0100981 A1* | 5/2007 | Adamczyk et al. | 709/223 |
| 2007/0112574 A1 | 5/2007 | Greene | |
| 2007/0118618 A1 | 5/2007 | Kisel et al. | |
| 2007/0118662 A1 | 5/2007 | Vishwanathan et al. | |
| 2007/0150480 A1 | 6/2007 | Hwang et al. | |
| 2007/0150936 A1 | 6/2007 | Maes | |
| 2007/0182541 A1 | 8/2007 | Harris et al. | |
| 2007/0192374 A1 | 8/2007 | Abnous et al. | |
| 2007/0192465 A1 | 8/2007 | Modarressi | |
| 2007/0197227 A1 | 8/2007 | Naqvi et al. | |
| 2007/0201376 A1 | 8/2007 | Marshall-Wilson | |
| 2007/0203841 A1 | 8/2007 | Maes | |
| 2007/0204017 A1 | 8/2007 | Maes | |
| 2007/0223462 A1 | 9/2007 | Hite et al. | |
| 2007/0233883 A1* | 10/2007 | De Lutiis et al. | 709/229 |
| 2007/0239866 A1 | 10/2007 | Cox et al. | |
| 2007/0271554 A1 | 11/2007 | Fletcher et al. | |
| 2007/0276907 A1 | 11/2007 | Maes | |
| 2007/0280226 A1 | 12/2007 | Sonalkar et al. | |
| 2007/0291859 A1 | 12/2007 | Maes | |
| 2008/0013533 A1 | 1/2008 | Bogineni et al. | |
| 2008/0025243 A1 | 1/2008 | Corneille et al. | |
| 2008/0037747 A1 | 2/2008 | Tucker | |
| 2008/0080479 A1 | 4/2008 | Maes | |
| 2008/0109853 A1 | 5/2008 | Einarsson et al. | |
| 2008/0126541 A1 | 5/2008 | Rosenberg et al. | |
| 2008/0127232 A1 | 5/2008 | Langen et al. | |
| 2008/0151768 A1 | 6/2008 | Liu | |
| 2008/0151918 A1 | 6/2008 | Foti | |
| 2008/0162637 A1* | 7/2008 | Adamczyk et al. | 709/204 |
| 2008/0168523 A1 | 7/2008 | Ansari et al. | |
| 2008/0175357 A1 | 7/2008 | Tucker | |
| 2008/0186845 A1 | 8/2008 | Maes | |
| 2008/0189401 A1 | 8/2008 | Maes | |
| 2008/0201705 A1 | 8/2008 | Wookey | |
| 2008/0228919 A1 | 9/2008 | Doshi et al. | |
| 2008/0232567 A1 | 9/2008 | Maes | |
| 2008/0235230 A1 | 9/2008 | Maes | |
| 2008/0235354 A1 | 9/2008 | Maes | |
| 2008/0235380 A1 | 9/2008 | Maes | |
| 2008/0275883 A1 | 11/2008 | Ashraf et al. | |
| 2008/0281607 A1 | 11/2008 | Sajja et al. | |
| 2008/0288966 A1 | 11/2008 | Maes | |
| 2008/0301135 A1 | 12/2008 | Alves et al. | |
| 2008/0307108 A1 | 12/2008 | Yan et al. | |
| 2009/0006360 A1 | 1/2009 | Liao et al. | |
| 2009/0015433 A1 | 1/2009 | James et al. | |
| 2009/0034426 A1 | 2/2009 | Luft et al. | |
| 2009/0112875 A1 | 4/2009 | Maes | |
| 2009/0119303 A1 | 5/2009 | Rio et al. | |
| 2009/0125595 A1 | 5/2009 | Maes | |
| 2009/0132717 A1 | 5/2009 | Maes | |
| 2009/0187919 A1 | 7/2009 | Maes | |
| 2009/0190603 A1 | 7/2009 | Damola et al. | |
| 2009/0193057 A1 | 7/2009 | Maes | |
| 2009/0193433 A1 | 7/2009 | Maes | |
| 2009/0201917 A1 | 8/2009 | Maes et al. | |
| 2009/0222541 A1 | 9/2009 | Monga et al. | |
| 2009/0228584 A1 | 9/2009 | Maes et al. | |
| 2009/0306834 A1 | 12/2009 | Hjelm et al. | |
| 2009/0328051 A1 | 12/2009 | Maes | |
| 2010/0049640 A1 | 2/2010 | Maes | |
| 2010/0049826 A1 | 2/2010 | Maes | |
| 2010/0058436 A1 | 3/2010 | Maes | |
| 2010/0070447 A1 | 3/2010 | Pfuntner et al. | |
| 2010/0077082 A1 | 3/2010 | Hession et al. | |
| 2010/0083285 A1 | 4/2010 | Bahat et al. | |
| 2010/0185772 A1 | 7/2010 | Wang et al. | |
| 2010/0192004 A1 | 7/2010 | Bauchot et al. | |
| 2011/0125909 A1 | 5/2011 | Maes | |
| 2011/0125913 A1 | 5/2011 | Maes | |
| 2011/0126261 A1 | 5/2011 | Maes | |
| 2011/0134804 A1 | 6/2011 | Maes | |
| 2011/0142211 A1 | 6/2011 | Maes | |
| 2011/0145278 A1 | 6/2011 | Maes | |
| 2011/0145347 A1 | 6/2011 | Maes | |
| 2011/0182205 A1 | 7/2011 | Gerdes et al. | |
| 2011/0258619 A1 | 10/2011 | Wookey | |
| 2012/0045040 A1 | 2/2012 | Maes | |
| 2012/0047506 A1 | 2/2012 | Maes | |
| 2012/0173745 A1 | 7/2012 | Maes | |

FOREIGN PATENT DOCUMENTS

WO  WO 2007134468 A1  11/2007

OTHER PUBLICATIONS

Andrews, Tony et al, Business Process Execution Language for Web Services, Version 1.1, BEA Systems, International Business Machines Corporation, SAP AG, Siebel Systems, May 5, 2003, 31 pages.

Liberty Architecture Overview, Liberty Alliance Project Version 1.1, Piscataway New Jersey, Jan. 15, 2003, 44 pages.

Maes, Stephanie, Multi-modal Browser Architecture. Overview on the support of multi-modal browsers in 3GPP, IBM Research Mobile Speech Solutions and Conversational Multi-modal Computing, downloaded http://www.w3.org on May 26, 2003, 25 pages.

Maes, Stephanie, Multi-modal Web IBM Position W3C/WAP Workshop, IBM Research Human Language Technologies, downloaded http://www.w3.org on May 26, 2003, 9 pages.

Parlay APIs 4.0, Parlay X Web Services White Paper, The Parlay Group, Parlay X Working Group, Dec. 16, 2002, 12 pages.

Policy-Based Management Tom Sheldon's Linktionary, downloaded http://www.linktionary.com/policy.html on Aug. 2, 2004, 4 pages.

Seely, Scott, "XML and Web Services Security: Understanding WS-Security", Microsoft Corporation, 2002.

Simpson et al, Java Product Review—Oracle EDA Suite, Dec. 4, 2006, Open Source Magazine, pp. 1-10.

Single Sign on Deployment Guide, Introduction to Single-Sign-On, Netscape 6 Documentation Training Manual http://developer.netscape.com/docs/manuals/security/SSO/sso.htm on May26, 2003, 5 Pages.

Sundsted, Todd E., with Liberty and single sign-on for all, The Liberty Alliance Project seeks to solve the current online identity crisis Java World, downloaded www.javaworld.com/javaworld/jw-02-2002/jw-0215-liberty.html on May 26, 2003, 7 pages.

Thomas Manes, Anne, "Registering a Web Service in UDDI", 2003.

U.S. Appl. No. 11/848,347, filed Aug. 31, 2007, Final Office Action mailed May 10, 2010, 15 pages.

U.S. Appl. No. 11/848,347, filed Aug. 31, 2007, Office Action mailed Oct. 29, 2009, 12 pages.

U.S. Appl. No. 11/877,129, filed Oct. 23, 2007, Advisory Action mailed Jun. 3, 2010, 2 pages.

U.S. Appl. No. 11/877,129, filed Oct. 23, 2007, Final Office Action mailed Mar. 29, 2010, 17 pages.

U.S. Appl. No. 11/877,129, filed Oct. 23, 2007, Office Action mailed Sep. 28, 2009, 15 pages.

U.S. Appl. No. 11/926,738, filed Oct. 29, 2007, Final Office Action mailed Jun. 29, 2010, 12 pages.

U.S. Appl. No. 11/926,738, filed Oct. 29, 2007, Office Action mailed Feb. 24, 2010, 12 pages.

U.S. Appl. No. 11/943,101, filed Nov. 20, 2007, Advisory Action mailed Apr. 16, 2010, 3 pages.

U.S. Appl. No. 11/943,101, filed Nov. 20, 2007, Final Office Action mailed Feb. 2, 2010, 9 pages.

U.S. Appl. No. 11/943,101, filed Nov. 20, 2007, Office Action mailed Jul. 8, 2009, 9 pages.

U.S. Appl. No. 12/019,299, filed Jan. 24, 2008, Office Action mailed Mar. 31, 2010, 13 pages.

U.S. Appl. No. 10/855,999, filed May 28, 2004, Office Action dated Jun. 24, 2010, 20 pages.

U.S. Appl. No. 10/855,999, filed May 28, 2004, Advisory Action dated Feb. 16, 2010, 3 pages.

U.S. Appl. No. 10/855,999, filed May 28, 2004, Advisory Action dated Feb. 2, 2009, 3 pages.

U.S. Appl. No. 10/855,999, filed May 28, 2004, Final Office Action dated Nov. 19, 2008, 12 pages.

U.S. Appl. No. 10/855,999, filed May 28, 2004, Final Office Action dated Nov. 23, 2009, 19 pages.

U.S. Appl. No. 10/855,999, filed May 28, 2004, Office Action dated Apr. 15, 2009, 13 pages.
U.S. Appl. No. 10/855,999, filed May 28, 2004, Office Action dated May 1, 2008, 9 pages.
U.S. Appl. No. 11/070,317, filed Mar. 1, 2005, Advisory Action dated May 19, 2009, 3 pages.
U.S. Appl. No. 11/070,317, filed Mar. 1, 2005, Final Office Action dated Feb. 2, 2010, 8 pages.
U.S. Appl. No. 11/070,317, filed Mar. 1, 2005, Final Office Action dated Mar. 4, 2009, 16 pages.
U.S. Appl. No. 11/070,317, filed Mar. 1, 2005, Office Action dated Apr. 30, 2010, 9 pages.
U.S. Appl. No. 11/070,317, filed Mar. 1, 2005, Office Action dated Aug. 18, 2009, 21 pages.
U.S. Appl. No. 11/070,317, filed Mar. 1, 2005, Office Action dated Aug. 5, 2008, 18 pages.
U.S. Appl. No. 11/130,636, filed May 16, 2005, Office Action dated Mar. 23, 2010, 6 pages.
U.S. Appl. No. 11/130,636, filed May 16, 2005, Office Action dated Sep. 18, 2009, 13 pages.
U.S. Appl. No. 12/045,220, filed Mar. 10, 2008, Advisory Action dated Jun. 11, 2010, 3 pages.
U.S. Appl. No. 12/045,220, filed Mar. 10, 2008, Final Office Action dated Apr. 2, 2010, 19 pages.
U.S. Appl. No. 12/045,220, filed Mar. 10, 2008, Office Action dated Oct. 2, 2009, 18 pages.
Maretzke, Michael, "JAIN SLEE Technology Overview", <http://www.maretzke.de/pub/lectures/jslee_overview_2005/JSLEE_Overview_2005.pdf>, Apr. 12, 2005, 26 pages.
O'Doherty, Phelim, "JSLEE—SIP Servlet", <http://java.sun.com/products/jain/JSLEE-SIPServlet.pdf, 2003, 13 pages.
The Parlay Group, "Specifications", <http://web.archive.org/web/20050114014707/www.parlay.org/specs/index.asp>, Jan. 14, 2005, 2 pages.
U.S. Appl. No. 11/926,738, filed Oct. 29, 2007, Advisory Action mailed Sep. 3, 2010, 2 pages.
U.S. Appl. No. 11/926,738, filed Oct. 29, 2007, Office Action mailed Nov. 10, 2010, 12 pages.
U.S. Appl. No. 12/019,299, filed Jan. 24, 2008, Advisory Action dated Dec. 9, 2010, 3 pages.
U.S. Appl. No. 12/019,299, filed Jan. 24, 2008, Office Action mailed Jan. 24, 2011, 16 pages.
U.S. Appl. No. 10/855,999, filed May 28, 2004, Final Office Action dated Jan. 5, 2011, 19 pages.
U.S. Appl. No. 11/123,468, filed May 5, 2005, Advisory Action dated Jan. 18, 2011, 2 pages.
U.S. Appl. No. 12/364,642, filed Feb. 3, 2009, Office Action dated Dec. 20, 2010, 18 pages.
U.S. Appl. No. 11/357,653, filed Feb. 16, 200, Office Action dated Jan. 20, 2011, 18 pages.
Wikipedia, "Parlay", <http://web.archive.org/web/20050130172632/en.wikipedia.org/wiki/Parlay>, Jan. 30, 2005, 3 pages.
Wikipedia, "Object-Oriented Programming", <http://web.archive.org/web/20051211141918/http://en.wikipedia.org/wiki/Object-oriented_programming>, Dec. 11, 2005, 10 pages.
Wikipedia, "OSI model", <http://web.archive.org/web/20050907132012/http://en.wikipedia.org/wiki/Osi_model>, Sep. 7, 2005, 8 pages.
Burger, E. et al., "Deploying CCXML for Application-Layer Call Control," Aug. 2006, 11 pages.
Kim et al., "Implementation of Third Party Based Call Control using Parlay Network API in SIP Environment," ICOIN 2003, LNCS 2662, 2003, pp. 416-425.
Romellini, C. et al., "CCXML: The Power of Standardization," Loquendo, Sep. 27, 2005.
U.S. Appl. No. 11/848,347, filed Aug. 31, 2007, Advisory Action mailed Jul. 27, 2010, 3 pages.
U.S. Appl. No. 11/848,347, filed Aug. 31, 2007, Office Action mailed Sep. 30, 2010, 19 pages.
U.S. Appl. No. 11/877,129, filed Oct. 23, 2007, Notice of Allowance mailed Aug. 5, 2010, 6 pages.
U.S. Appl. No. 11/943,101, filed Nov. 20, 2007, Office Action mailed Aug. 27, 2010, 11 pages.
U.S. Appl. No. 12/019,299, filed Jan. 24, 2008, Final Office Action mailed Oct. 6, 2010, 20 pages.
U.S. Appl. No. 10/856,588, filed May 28, 2004, Advisory Action dated Jan. 5, 2010, 3 pages.
U.S. Appl. No. 10/856,588, filed May 28, 2004, Final Office Action dated Oct. 15, 2008, 11 pages.
U.S. Appl. No. 10/856,588, filed May 28, 2004, Final Office Action dated Oct. 20, 2009, 17 pages.
U.S. Appl. No. 10/856,588, filed May 28, 2004, Notice of Allowance dated Sep. 23, 2010, 8 pages.
U.S. Appl. No. 10/856,588, filed May 28, 2004, Office Action dated Mar. 16, 2009, 10 pages.
U.S. Appl. No. 10/856,588, filed May 28, 2004, Office Action dated Apr. 11, 2008, 16 pages.
U.S. Appl. No. 11/024,160, filed Dec. 27, 2004, Advisory Action dated Feb. 18, 2010, 3 pages.
U.S. Appl. No. 11/024,160, filed Dec. 27, 2004, Final Office Action dated Oct. 15, 2010, 11 pages.
U.S. Appl. No. 11/024,160, filed Dec. 27, 2004, Final Office Action dated Dec. 3, 2009, 11 pages.
U.S. Appl. No. 11/024,160, filed Dec. 27, 2004, Final Office Action dated Feb. 11, 2009, 9 pages.
U.S. Appl. No. 11/024,160, filed Dec. 27, 2004, Office Action dated Jun. 29, 2009, 9 pages.
U.S. Appl. No. 11/024,160, filed Dec. 27, 2004, Office Action dated Jun. 9, 2010, 10 pages.
U.S. Appl. No. 11/024,160, filed Dec. 27, 2004, Office Action dated Aug. 22, 2008, 8 pages.
U.S. Appl. No. 11/070,317, filed Mar. 1, 2005, Final Office Action dated Sep. 27, 2010, 8 pages.
U.S. Appl. No. 11/123,468, filed May 5, 2005, Advisory Action dated Feb. 17, 2010, 3 pages.
U.S. Appl. No. 11/123,468, filed May 5, 2005, Final Office Action dated Nov. 24, 2009, 19 pages.
U.S. Appl. No. 11/123,468, filed May 5, 2005, Office Action dated Apr. 10, 2009, 17 pages.
U.S. Appl. No. 11/123,468, filed May 5, 2005, Office Action dated Apr. 14, 2010, 16 pages.
U.S. Appl. No. 11/123,468, filed May 5, 2005, Final Office Action dated Nov. 10, 2010, 18 pages.
U.S. Appl. No. 11/123,471, filed May 5, 2005, Notice of Allowance dated Jun. 29, 2009, 6 pages.
U.S. Appl. No. 11/123,471, filed May 5, 2005, Office Action dated Jan. 23, 2009, 8 pages.
U.S. Appl. No. 11/130,636, filed May 16, 2005, Notice of Allowance mailed Aug. 18, 2010, 4 pages.
U.S. Appl. No. 11/939,705, filed Nov. 14, 2007, Office Action mailed Oct. 4, 2010, 21 pages.
U.S. Appl. No. 11/848,347, filed Aug. 31, 2007, Final Office Action mailed Mar. 7, 2011, 21 pages.
U.S. Appl. No. 11/926,738, filed Oct. 29, 2007, Final Office Action mailed Mar. 17, 2011, 13 pages.
U.S. Appl. No. 11/943,101, filed Nov. 20, 2007, Final Office Action mailed Feb. 14, 2011, 11 pages.
U.S. Appl. No. 12/544,459, filed Aug. 20, 2009, Office Action dated Mar. 2, 2011, 10 pages.
U.S. Appl. No. 10/855,999, filed May 28, 2004, Advisory Action dated Mar. 16, 2011, 3 pages.
U.S. Appl. No. 11/024,160, filed Dec. 27, 2004, Office Action dated Feb. 7, 2011, 11 pages.
U.S. Appl. No. 11/939,705, filed Nov. 14, 2007, Final Office Action mailed Mar. 17, 2011, 21 pages.
Author Unknown, "Assuring Quality of Experience for IPTV—White Paper," Heavy Reading, Jul. 2006, 18 pages.
Author Unknown, "LTE Mobile Transport Evolution—Strategic White Paper," Alcatel Lucent, accessed Jan. 10, 2012 from http://lte.alcatel-lucent.com/locale/en_us/downloads/Alcatel-Lucent_LTE_Transport_WhitePaper.pdf, 2011, 16 pages.
Dhesikan, "Quality of Service for IP Videoconferencing—Engineering White Paper," Cisco Systems Jun. 1, 2001, 16 pages.

U.S. Appl. No. 11/943,101, filed Nov. 20, 2007, Notice of Allowance mailed Dec. 9, 2011, 7 pages.
U.S. Appl. No. 12/019,335, filed Jan. 24, 2008, Final Office Action mailed Dec. 5, 2011, 19 pages.
U.S. Appl. No. 12/364,642, filed Feb. 3, 2009, Office Action dated Oct. 18, 2011, 21 pages.
U.S. Appl. No. 11/357,653, filed Feb. 16, 2006, Advisory Action dated Oct. 12, 2011, 3 pages.
U.S. Appl. No. 12/544,471, filed Aug. 20, 2009, Office Action dated Jan. 6, 2012, 8 pages.
U.S. Appl. No. 12/544,484, filed Aug. 20, 2009, Final Office Action dated Dec. 1, 2011, 8 pages.
U.S. Appl. No. 11/969,343, filed Jan. 4, 2008, Final Office Action mailed Oct. 21, 2011, 11 pages.
U.S. Appl. No. 11/969,343, filed Jan. 4, 2008, Advisory Action mailed Jan. 5, 2012, 3 pages.
International Search Report and Written Opinion of PCT/US2010/037074 mailed Jun. 1, 2011, 16 pages.
U.S. Appl. No. 11/848,347, filed Aug. 31, 2007, Advisory Action mailed May 23, 2011, 3 pages.
U.S. Appl. No. 11/926,738, filed Oct. 29, 2007, Advisory Action mailed May 25, 2011, 3 pages.
U.S. Appl. No. 11/926,738, filed Oct. 29, 2007, Notice of Allowance mailed Aug. 5, 2011, 13 pages.
U.S. Appl. No. 11/943,101, filed Nov. 20, 2007, Advisory Action mailed Apr. 28, 2011, 3 pages.
U.S. Appl. No. 11/943,101, filed Nov. 20, 2007, Office Action mailed Jul. 28, 2011, 11 pages.
U.S. Appl. No. 11/024,160, filed Dec. 27, 2004, Final Office Action dated Jun. 1, 2011, 11 pages.
U.S. Appl. No. 11/024,160, filed Dec. 27, 2004, Notice of Allowance dated Aug. 4, 2011, 15 pages.
U.S. Appl. No. 11/939,705, filed Nov. 14, 2007, Office Action mailed Sep. 28, 2011, 15 pages.
U.S. Appl. No. 12/045,220, filed Mar. 10, 2008, Office Action dated Sep. 27, 2011, 20 pages.
U.S. Appl. No. 12/019,335, filed Jan. 24, 2008, Office Action mailed May 23, 2011, 18 pages.
U.S. Appl. No. 12/364,642, filed Feb. 3, 2009, Final Office Action dated Jul. 1, 2011, 20 pages.
U.S. Appl. No. 12/364,642, filed Feb. 3, 2009, Advisory Action dated Sep. 16, 2011, 3 pages.
U.S Appl. No. 11/357,653, filed Feb. 16, 2006, Final Office Action dated Aug. 2, 2011, 19 pages.
U.S. Appl. No. 12/544,459, filed Aug. 20, 2009, Notice of Allowance mailed Aug. 22, 2011, 8 pages.
U.S. Appl. No. 12/544,484, filed Aug. 20, 2009, Office Action dated Jun. 3, 2011, 6 pages.
U.S. Appl. No. 11/949,930, filed Dec. 4, 2007, Office Action mailed Sep. 29, 2011, 19 pages.
U.S. Appl. No. 11/969,343, filed Jan. 4, 2008, Office Action mailed Jun. 10, 2011, 13 pages.
U.S. Appl. No. 12/014,387, filed Jan. 15, 2008, Office Action mailed Sep. 7, 2011, 18 pages.
U.S. Appl. No. 12/018,718, filed Jan. 23, 2008, Office Action mailed Jun. 22, 2011, 23 pages.
U.S. Appl. No. 12/019,299, filed Jan. 24, 2008, Final Office Action mailed Aug. 25, 2011, 20 pages.
U.S. Appl. No. 11/848,347, filed Aug. 31, 2007, Notice of Allowance mailed Mar. 2, 2012, 9 pages.
U.S. Appl. No. 11/070,317, filed Mar. 1, 2005, Office Action dated Mar. 15, 2012, 10 pages.
U.S. Appl. No. 11/939,705, filed Nov. 14, 2007, Final Office Action mailed Mar. 15, 2012, 16 pages.
U.S. Appl. No. 12/045,220, filed Mar. 10, 2008, Final Office Action dated Mar. 15, 2012, 20 pages.
U.S. Appl. No. 12/019,335, filed Jan. 24, 2008, Advisory Action mailed Feb. 27, 2012, 3 pages.
U.S. Appl. No. 12/544,484, filed Aug. 20, 2009, Advisory Action dated Feb. 9, 2012, 2 pages.
U.S. Appl. No. 11/949,930, filed Dec. 4, 2007, Notice of Allowance mailed Mar. 19, 2012, 19 pages.
U.S. Appl. No. 12/014,387, filed Jan. 15, 2008, Final Office Action mailed Apr. 5, 2012, 17 pages.
U.S. Appl. No. 12/018,718, filed Jan. 23, 2008, Final Office Action mailed Feb. 1, 2012, 30 pages.
U.S. Appl. No. 12/019,299, filed Jan. 24, 2008, Advisory Action mailed Nov. 3, 2011, 2 pages.
U.S. Appl. No. 12/019,299, filed Jan. 24, 2008, Office Action mailed Feb. 16, 2012, 18 pages.
U.S. Appl. No. 11/939,705, filed Nov. 14, 2007, Advisory Action mailed Jun. 1, 2012, 9 pages.
U.S. Appl. No. 11/939,705, filed Nov. 14, 2007, Office Action mailed Jul. 6, 2012, 13 pages.
U.S. Appl. No. 12/045,220, filed Mar. 10, 2008, Advisory Action dated May 31, 2012, 3 pages.
U.S. Appl. No. 12/364,642, filed Feb. 3, 2009, Final Office Action dated Jun. 19, 2012, 24 pages.
U.S. Appl. No. 11/357,653, filed Feb. 16, 2006, Office Action dated Apr. 26, 2012, 18 pages.
U.S. Appl. No. 12/490,540, filed Jun. 24, 2009, Office Action dated Jul. 6, 2012, 16 pages.
U.S. Appl. No. 12/014,387, filed Jan. 15, 2008, Advisory Action mailed Jun. 15, 2012, 3 pages.
U.S. Appl. No. 12/948,247, filed Nov. 17, 2010, Office Action mailed Jul. 6, 2012, 14 pages.
U.S. Appl. No. 12/791,129, filed Jun. 1, 2010, Office Action mailed Jul. 10, 2012, 14 pages.
U.S. Appl. No. 13/416,413, filed Mar. 9, 2012, Office Action mailed Apr. 27, 2012, 11 pages.

* cited by examiner

ACHIEVING LOW LATENCIES ON NETWORK EVENTS IN A NON-REAL TIME PLATFORM

CROSS-REFERENCES TO RELATED APPLICATIONS

The resource adapter 415 can be implemented using various standard components including, but not limited to, a CORBA-to-Java layer 520, a Parlay managed connection module 522, and a Parlay connection module 524. The resource adapter 415 can include a number of interface or interaction modules such as a call control database interface 530, a call control interaction module 526, a multi-party call control interaction module 528, and a multi-party call control interface 535 as provided as part of the JCA 1.5 standard and as can be understood by one skilled in the art. The call control interaction module 526 and multi-party call control interaction module 528 can be implemented, for example as described in U.S. patent application Ser. No. 11/949,930 filed Dec. 4, 2007, by Maes and entitled "CALL CONTROL ENABLER ABSTRACTED FROM UNDERLYING NETWORK TECHNOLOGIES", which is herein incorporated by reference. According to these methods and systems, the call control can then also be implemented on SIP (e.g. via SIP servlets) or on other network protocols via, for example, JCA 1.5 adapters to these resources/protocols. Additionally, the resource adapter 415 can include Java Management eXtension MBeans 534, a performance monitoring module 536, a logging module 538, and an initialization module 540. The resource adapter 415 can also include a persistence database interface 542 for interfacing with a persistence database 515 and 510 to provide persistence 505. It should be noted that, in some embodiment and depending upon the implementation of the adapters, the enabler can implement other resources or protocol such as SS7, CAMEL, IN, INAP, TCAP, TAPI, etc.

BACKGROUND OF THE INVENTION

Embodiments of the present invention relate generally to communications in a network and more particularly to providing low-latency handling of network events in a real time environment while utilizing non-real time components.

A service delivery platform is typically used to deliver various types of services to devices used by users that are based on network/service provider resources used in services provided by the service provider or by a third party that uses these features to extend the features of their applications. Different devices can be contacted through various networks and the networks may communicate through different protocols and channels. The service delivery platform can be used to provide a variety of communication services using wired or wireless communications networks.

However, service delivery platforms are typically implemented using a non-real time components. Therefore, the performance of the typical service delivery platform can lack the low-latency performances desired for some applications. For example, telephone company (telco) implementations in which a high level of throughput with predictable, low-latencies are desired can be difficult to implement in current service delivery platforms utilizing standard non-real time components. Hence, there is a need for methods and systems that provide predictable, low-latency handling of network events in a real time environment while utilizing non-real time components.

BRIEF SUMMARY OF THE INVENTION

Embodiments of the invention provide systems and methods for providing low-latency handling of events and/or requesting actions of external resources in a real time environment while utilizing non-real time components. According to one embodiment, a system for providing predictable low-latency handling and high throughput of events in a real time environment while utilizing non-real time components can comprise an external resource and a resource adapter communicatively coupled with the external resource. The system can also include at least one local application communicatively coupled with the resource adapter. The local application can have a local interface such as an Application Program Interface (API) Library and the local application can interact with the resource adapter via the local interface In some cases, the resource adapter can detect events of the external resource and request actions based on the event. For example, the local applications can be adapted to receive an indication of a network event from the resource adapter via the local interface. The local application can be further adapted to react to the network event. For example, the local application can be adapted to react to the network event by requesting an action of a resource on the communication network via the local interface and the resource adapter.

In other cases, the local application can be adapted to request an action of a resource via the local interface and the resource adapter with or without first receiving an indication of an event. Whether reacting to a network event or initiating an action of a resource, the local application can be adapted to perform various functions including but not limited to call control, multi-party call control, media control, user interaction/voice interaction, accessing location, presence, etc. Responses from the enablers and/or application or requests initiated by them can be passed via a local interface of the enabler. According to one embodiment, the interfaces can pass data by reference instead of by value. In this way events can be passed faster pass and garbage collection can be performed more quickly as the size of a resource adapter session/instance is reduced.

In some cases, the external resource can comprise a communication network. The communication network can include a Parlay Gateway. In such a case, the resource adapter can comprise a Parlay Java Rulebook J2EE Connector Architecture (JCA) 1.5 resource adapter and the local interface can comprise a Parlay Java Rulebook API library. In another case, the communications network can utilize a Diameter base protocol. In such a case, the resource adapter can comprise a Diameter J2EE Connector Architecture (JCA) 1.5 resource adapter and the local API library can comprise a Diameter API library. Other protocols and implementations are also contemplated and considered to be within the scope of the present invention (e.g. messaging protocols, charging protocols, Signaling System 7 (SS7), Customized Applications for Mobile Network Enhanced Logic (CAMEL), Intelligent Network Application Part (INAP), Transaction Capabilities Application Part (TCAP), etc.).

According to another embodiment, a method for providing low-latency handling of external events in a real time environment while utilizing non-real time components can comprise detecting with a resource adapter an external event. An indication of the event can be sent from the resource adapter to a local application via a local interface such as an Application Program Interface (API) library of the local application. The local application can then handle the event. For example, handling the event with the local application can comprise requesting an action of a resource via the local interface and the resource adapter. Additionally or alternatively, handling the event with the local application can comprise performing call control, performing multi-party call control, providing a call notification, performing media control, interfacing with an Interactive Voice Response (IVR) system or a location server, providing a web service, or performing many other functions (e.g. multimedia messaging, conferencing, etc).

According to yet another embodiment, a method for requesting actions of external resources in a real time environment while utilizing non-real time components can comprise sending a request for an action of an external resource, such as a network resource from a local application via a local interface of the local application. For example, sending the request for the action of the resource from the local application can be performed in response to a call control function of the local application. In another example, sending the request for the action of the resource from the local application can be performed in response to a multi-party call control function of the local application. In yet another example, sending the request for the action of the resource from the local application can be performed in response to a media control function of the local application. In still another example, sending the request for the action of the resource from the local application can be performed in response to a web service function of the local application.

The request for the action of the resource can be received at a resource adapter via the local interface of the local application. The action of the network resource can be requested from the resource adapter. In some cases, the external resource can comprise a communication network which can include a Parlay Gateway. In such a case, the resource adapter can comprise a Parlay Java Rulebook J2EE Connector Architecture (JCA) 1.5 resource adapter and the local interface can comprise a Parlay Java Rulebook API library. In another case, the communications network can utilize a Diameter base protocol. In such a case, the resource adapter can comprise a Diameter J2EE Connector Architecture (JCA) 1.5 resource adapter and the local interface can comprise a Diameter API library. Other protocols (e.g. messaging protocols, charging protocols, SS7, CAMEL, INAP, TCAP, etc.) and implementations are also contemplated and considered to be within the scope of the present invention.

The procedures described herein to achieve low, predictable latencies and high throughput when using non-real time components are not exclusive and can be used in combination with other procedures. For example, when implemented on a Java Virtual Machine, Virtual Machine optimization can be done to minimize the performance impact of routine processes like garbage collection. For example, according to one embodiment, if implemented on a platform with garbage Collection (e.g. JEE). The resource adapters and applications or enablers can be implemented so that the platform (e.g. JVM) can manage the sessions and/or virtual machine so that the size of the data to process by garbage collection does not grow too big. So for example, in a multithreaded environment, an adapter can manage the thread pools for that adapter to reduce the amount of threads/data to clean.

DETAILED DESCRIPTION OF THE INVENTION

Figure 1:
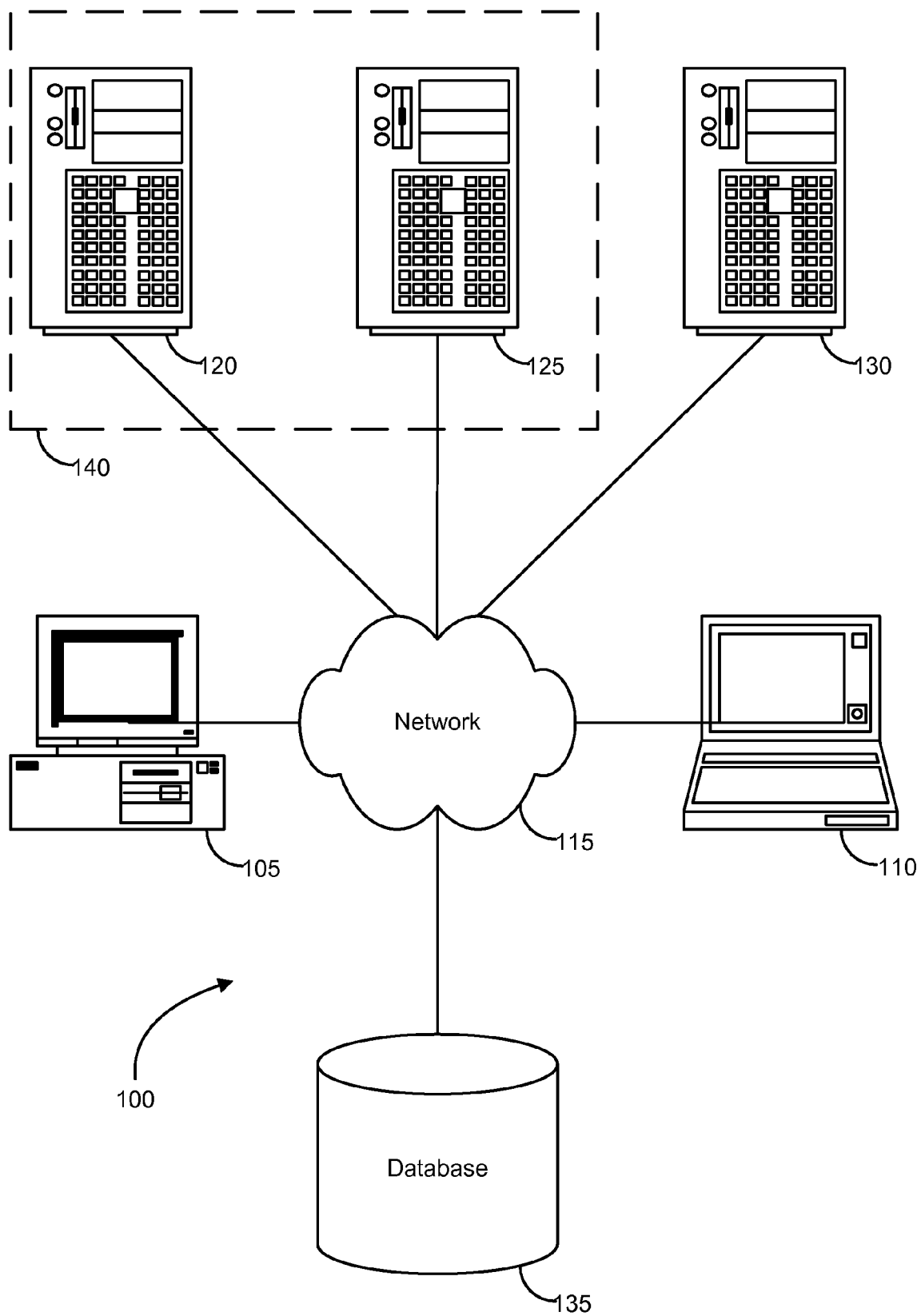
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/ or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for providing low-latency handling of network events and/or requesting of actions of network resources in a real time environment while utilizing non-real time components. Generally speaking, a system according to one embodiment of the present invention can comprise a communications network and a resource adapter communicatively coupled with the communications network. The resource adapter can be adapted to detect network events on the communications network and request actions of resources on the communications network. The system can also include at least one local application communicatively coupled with the resource adapter. The local application can have a local interface such as an Application Program Interface (API) Library and the local application can interact with the resource adapter via the local interface. That is, the local application, which can provide for handling of network events and/or requesting resource actions, can communicate with the resource adapter via the local interface in order to reduce remote interfaces and remote lookups that introduce latencies and degrade performance. Furthermore, according to one embodiment, the local application can be maintained within two methods or processes, i.e., the resource adapter and the local interface, of the network, further improving performance and reducing latencies.

As will be seen, the local applications can be adapted to receive an indication of a network event from the resource adapter via the local interface. The local application can be further adapted to react to the network event. For example, the local application can be adapted to react to the network event by requesting an action of a resource on the communication network via the local interface and the resource adapter. In other cases, the local application can be adapted to request an action of a resource on the communication network via the local interface and the resource adapter with or without first receiving an indication of a network event. Whether reacting to a network event or initiating an action of a network resource, the local application can be adapted to perform various functions including but not limited to call control, multi-party call control, media control, web services, etc.

It should be understood that, while described herein with reference to a communication network and network resources, embodiments of the present invention are not limited to implementation in or with a communication network. Rather, embodiments of the present invention can be implemented to provide low-latency handling of resources external to the environment, i.e., external to the applications with which they interact. Embodiments described herein with reference to a communication network and/or network resources are offered by way of example rather than limitation. In other implementations, the resources may be any resource external to the environment or platform of the controlling applications, e.g., other protocols, entities including, for example, Operation Support Systems (OSS) or Business Support Systems (BSS) functions/resources), systems, environments, etc.

FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/ Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3 G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g. 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
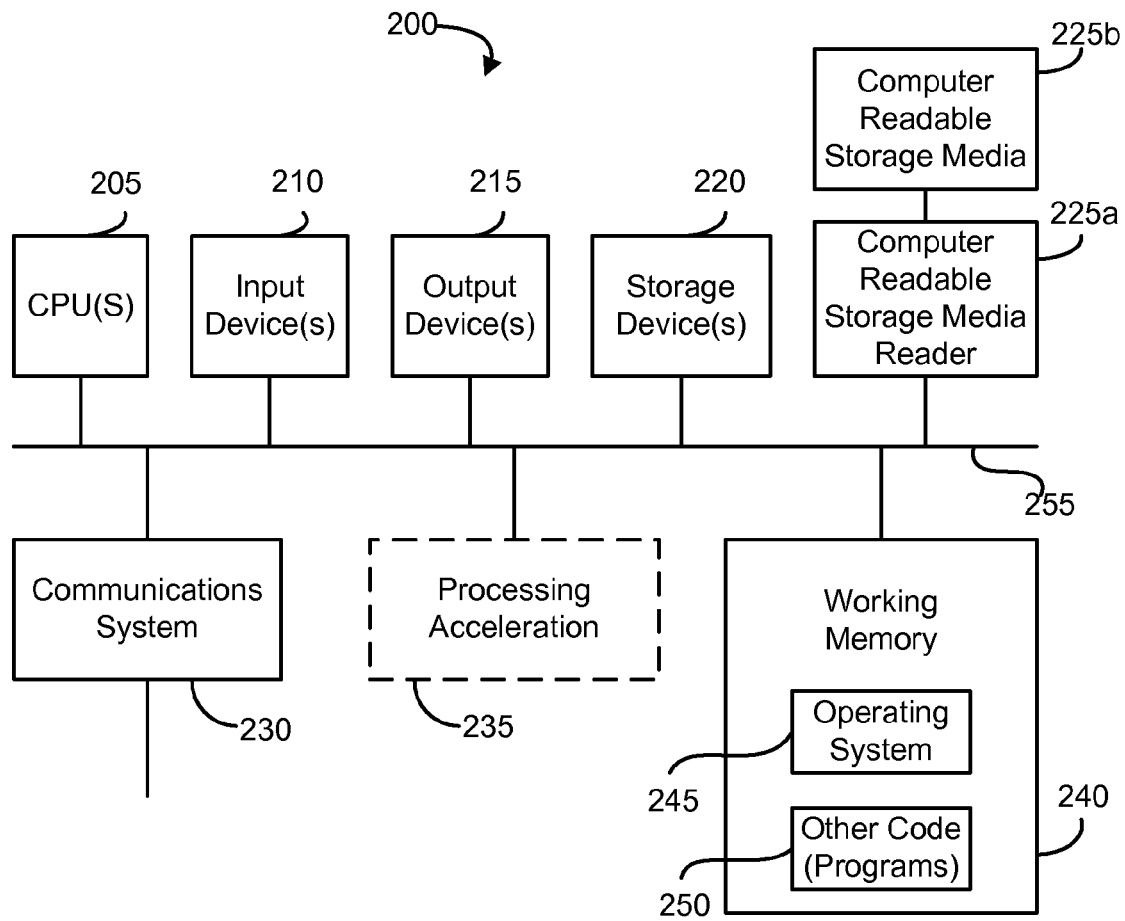
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
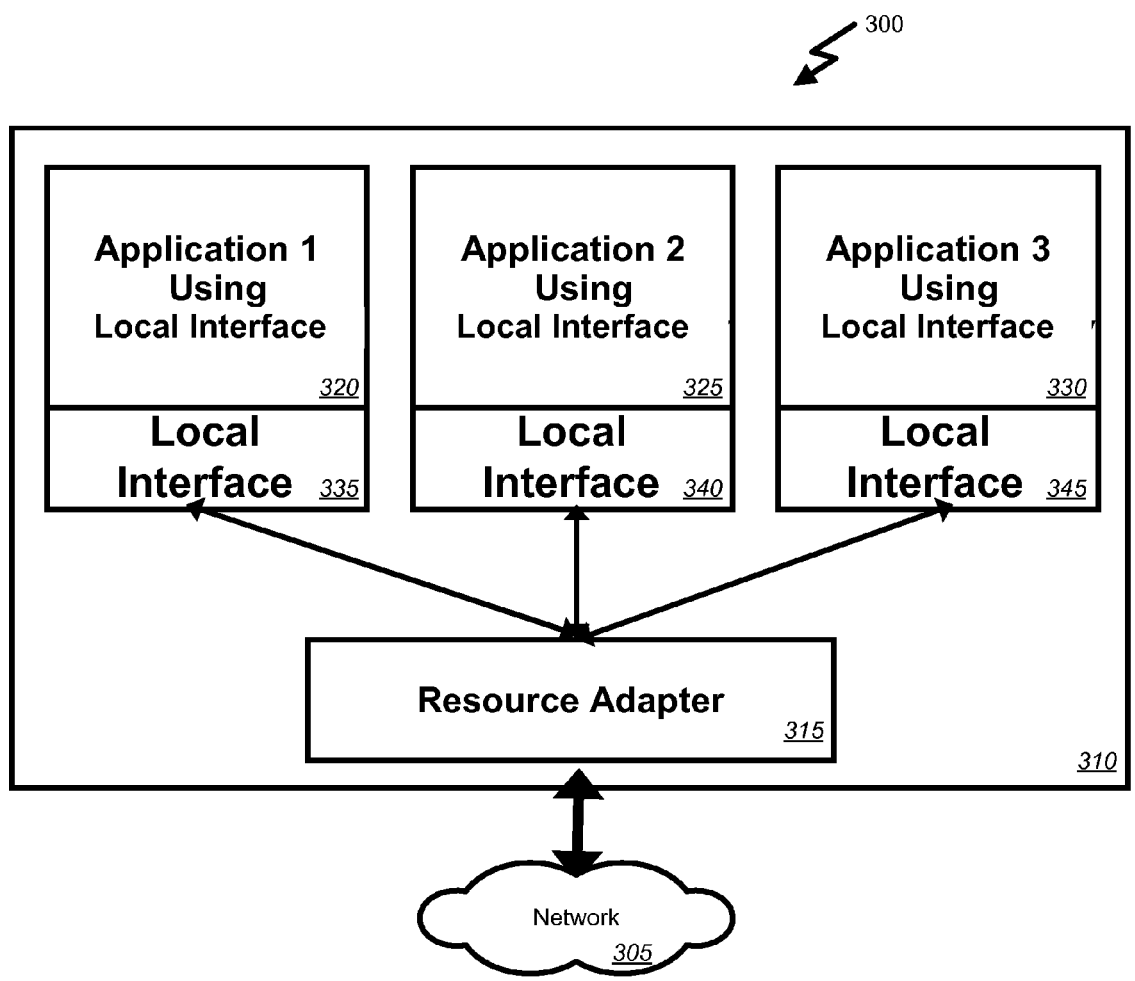
FIG. 3 is a block diagram illustrating, at a high level, a system for providing low-latency handling of events in a real time environment while utilizing non-real time components according to one embodiment of the present invention.

FIG. 3 is a block diagram illustrating, at a high level, a system for providing low-latency handling of events and/or requesting resource actions in a real time environment while utilizing non-real time components according to one embodiment of the present invention. As noted above, while described herein with reference to a communication network and network resources, embodiments of the present invention are not limited to implementation in or with a communication network. Rather, embodiments of the present invention can be implemented to provide low-latency handling of resources external to the environment. Embodiments described herein with reference to a communication network and/or network resources are offered by way of example rather than limitation.

In this example, the system 300 comprises a communications network 305 and a local control module 310. The communications network can comprise any of a variety of networks operating any of a variety of protocols as described above or as will be described below. The local control module 310 can be communicatively coupled with the communications network 305 and, as will be described in detail below, can be adapted to handle network events and/or request actions by one or more resources (not shown here) of the network 305 and thus can be used to implement a node of a service delivery platform. Generally speaking, the local control module 310 can include a resource adapter 315 and one or more local applications 320-330.

The resource adapter 315 can be communicatively coupled with the communications network 305. The resource adapter 315 can be adapted to detect network events on the communications network 305 and request actions of resources on the communications network 305. The local applications 320-330 can be communicatively coupled with the resource adapter 315. The local applications 320-330 can each have a local interface 335-345 such as an Application Program Interface (API) Library. According to one embodiment, each local application 320-330 can interact with the resource adapter 315 via the local interface 335-345 for that application. That is, a local application 320, which can provide for handling of network events and/or requesting resource actions, can communicate with the resource adapter 315 via the local interface 335 for that application 320 in order to reduce remote interfaces and remote lookups that introduce latencies and degrade performance. Furthermore, according to one embodiment, the local application 320 can be maintained within two methods, i.e., the resource adapter 315 and the local interface 335, of the network 305, further improving performance and reducing latencies.

One or more of the local applications 320-330 can be adapted to receive an indication of a network event from the resource adapter 315 via the local interface 335-345 for the respective application. The local application 320 receiving the indication of the event can be further adapted to react to the network event. For example, the local application 320 can be adapted to react to the network event by requesting an action of a resource on the communication network via the local interface 335 and the resource adapter 315. In other cases, the local application 320 can be adapted to request an action of a resource on the communication network via the local interface 335 and the resource adapter 315 with or without first receiving an indication of a network event. Whether reacting to a network event or initiating an action of a network resource, the local application 320 can be adapted to perform various functions including but not limited to call control, multi-party call control, media control, web services, etc. In some cases, the application can alternatively provide a notification of the event, even if there is no other reaction, to help provide predictable low latencies.

It should be understood that the APIs used by the local applications 320-330 may be any wrappers and/or technology. For example and as will be described below, if the application is implemented in a Java Enterprise Edition (JEE) environment, the interface may be implemented as a Plain Old Java Object (POJO), Enterprise Java Bean (EJB) or other suitable object. In other examples, such as when implemented remotely, the interfaces can be implemented as a web service, POJO, EJB, Java Message Service (JMS), Service-Oriented Architecture (SOA), etc. When implemented using JMS or EJB etc an application as described here with reference to FIG. 3 can be treated in the same way as a remote interface as will be described below with reference to FIG. 6. Regardless of exactly how the interfaces 320-330 are implemented, the interfaces 320-330 may be adapted to pass data by reference instead of by value. If implemented in this way, events can be passed faster and processes such as garbage collection can be performed more quickly as the size of a resource adapter session/instance is reduced. Additional details of the system 300 and exemplary implementations thereof will be described below.

Figure 4:
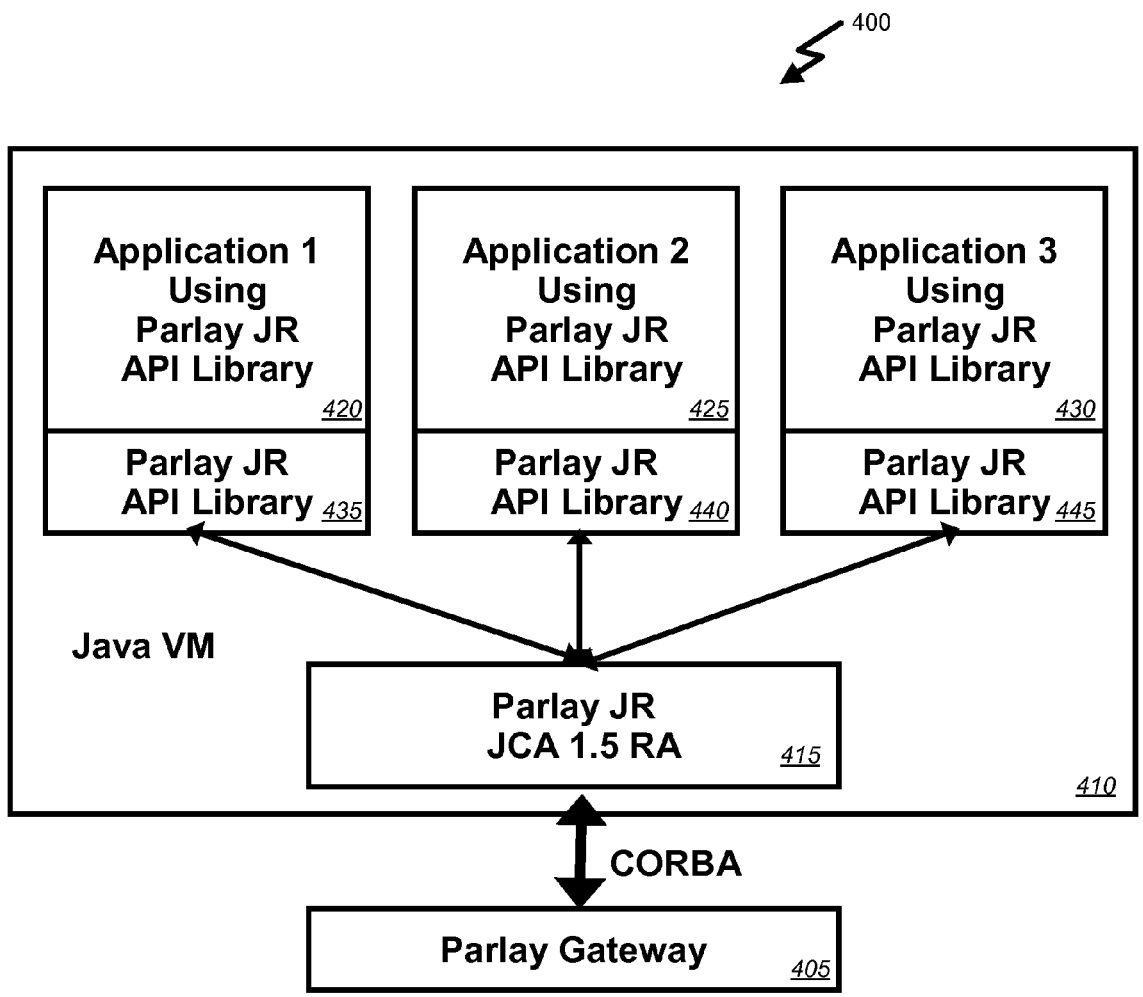
FIG. 4 is a block diagram illustrating one implementation of a system for handling network events and/or requesting network actions according to one embodiment of the present invention.

FIG. 4 is a block diagram illustrating one implementation of a system for handling network events and/or requesting network actions according to one embodiment of the present invention. This example illustrates a system 400 as discussed above with reference to FIG. 3. However, in this example, the local control module 410 can be implemented in a Java Virtual Machine. Also as illustrated in this example, the communications network can include a Parlay gateway 405. In such a case, the resource adapter 415 can comprise a bi-directional resource adapter such as a Parlay Java Rulebook J2EE Connector Architecture (JCA) 1.5 resource adapter as described in Java Specification Request 112 entitled "J2EE Connector Architecture" published by the Java Community Process Program or Java enterprise Edition (JEE) as described in Java Specification Request 244 entitled "Java Platform, Enterprise Edition 5 (Java EE 5) Specification" published by the Java Community Process Program. In such an implementation, the local API libraries 435-445 can comprise Parlay Java Rulebook API libraries. The resource adapter 415 and the local API libraries 435-445 can be implemented using standard Parlay and JCA components as will be illustrated below.

Figure 5:
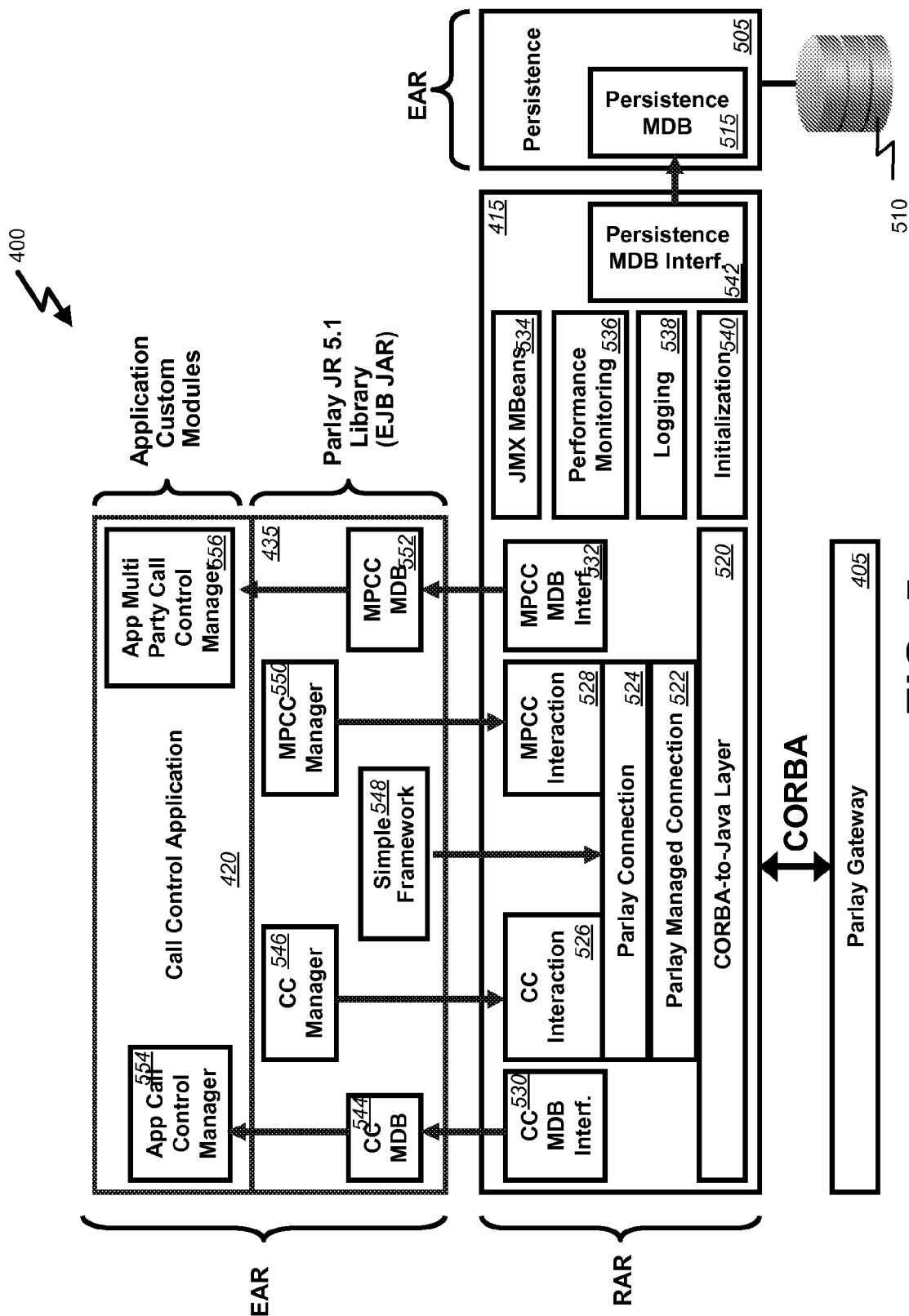
FIG. 5 is a block diagram illustrating additional details of the system illustrated in FIG. 4.

FIG. 5 is a block diagram illustrating additional details of the system illustrated in FIG. 4. That is, the example here illustrates additional details of the system 400 implemented using standard Parlay and JCA components. Generally speaking, the system 400 can be packaged as a set of Java Enterprise Application aRchives (EARs) and Resource Adapter aRchives (RARs). For example, the a resource adapter 415 can be packaged as an RAR and a local API library 435 and applications 420 can be packaged as an EAR. Additionally, a persistence module 505 can be packaged as an EAR.

The resource adapter 415 can be implemented using various standard components including, but not limited to, a CORBA-to-Java layer 520, a Parlay managed connection module 522, and a Parlay connection module 524. The resource adapter 415 can include a number of interface or interaction modules such as a call control database interface 530, a call control interaction module 526, a multi-party call control interaction module 528, and a multi-party call control interface 535 as provided as part of the JCA 1.5 standard and as can be understood by one skilled in the art. The call control interaction module 526 and multi-party call control interaction module 528 can be implemented, for example as described in U.S. patent application Ser. No. 11/949,930 filed Dec. 4, 2007 by Maes and entitled "CALL CONTROL ENABLER ABSTRACTED FROM UNDERLYING NETWORK TECHNOLOGIES", which is herein incorporated by reference. According to these methods and systems, the call control can then also be implemented on SIP (e.g. via SIP servlets) or on other network protocols via, for example, JCA 1.5 adapters to these resources/protocols. Additionally, the resource adapter 415 can include Java Management eXtension MBeans 534, a performance monitoring module 536, a logging module 538, and an initialization module 540. The resource adapter 415 can also include a persistence database interface 542 for interfacing with a persistence database 515 and 510 to provide persistence 505. It should be noted that, in some embodiment and depending upon the implementation of the adapters, the enabler can implement other resources or protocol such as SS7, CAMEL, IN, INAP, TCAP, TAPI, etc.

Similarly, the local API library 435 can include standard components as provided as part of the JCA 1.5 standard and as can be understood by one skilled in the art. For example, the local API library 435 can include a call control manager 546, a simple framework 548, and a multi-party call control manager 550 for interacting with components of the resource adapter 415. The local API library can also include a call control database 544 and a multi-party call control database 552. Again, the elements of the local API library can be implemented as provided as part of the JCA 1.5 standard and as can be understood by one skilled in the art.

Finally, the local application 420, in this case an application for performing call control, can include modules for handling network events detected by the resource adapter 415 and passed through the local API library 435 and/or for requesting actions of a network resource via the local API library 435 and resource adapter 415. For example, the local application 420 can include a call control manager 554 and a multi-party call control manager 550. Additionally or alternatively, the local application 420 can include other types of managers for performing other types of functions including but not limited to media control, providing a web service, etc. According to one embodiment and as illustrated here, the different local APIs can be divided or distributed to avoid having to do introspection which can in turn lead to unpredictable delays. So, for example, call control manager 546 of the local API 435 can process southbound calls to the call control interaction module 526 of the resource adapter 415 while the multi-party call control manager 550 of the local API 435 can process southbound calls to the multi-party call control interaction module 528 of the resource adapter 415. Similarly, the call control MDB interface module 530 of the resource adapter 415 can handle northbound calls to the call control MDB interface 544 of the local API 435 while the multi-party call control MDB interface module 532 of the resource adapter 415 can handle northbound calls to the multi-party call control MDB interface 552 of the local API 435. By distributing the local API 435 in such a manner, In this way, introspection and MDB lookups can be avoid.

Figure 6:
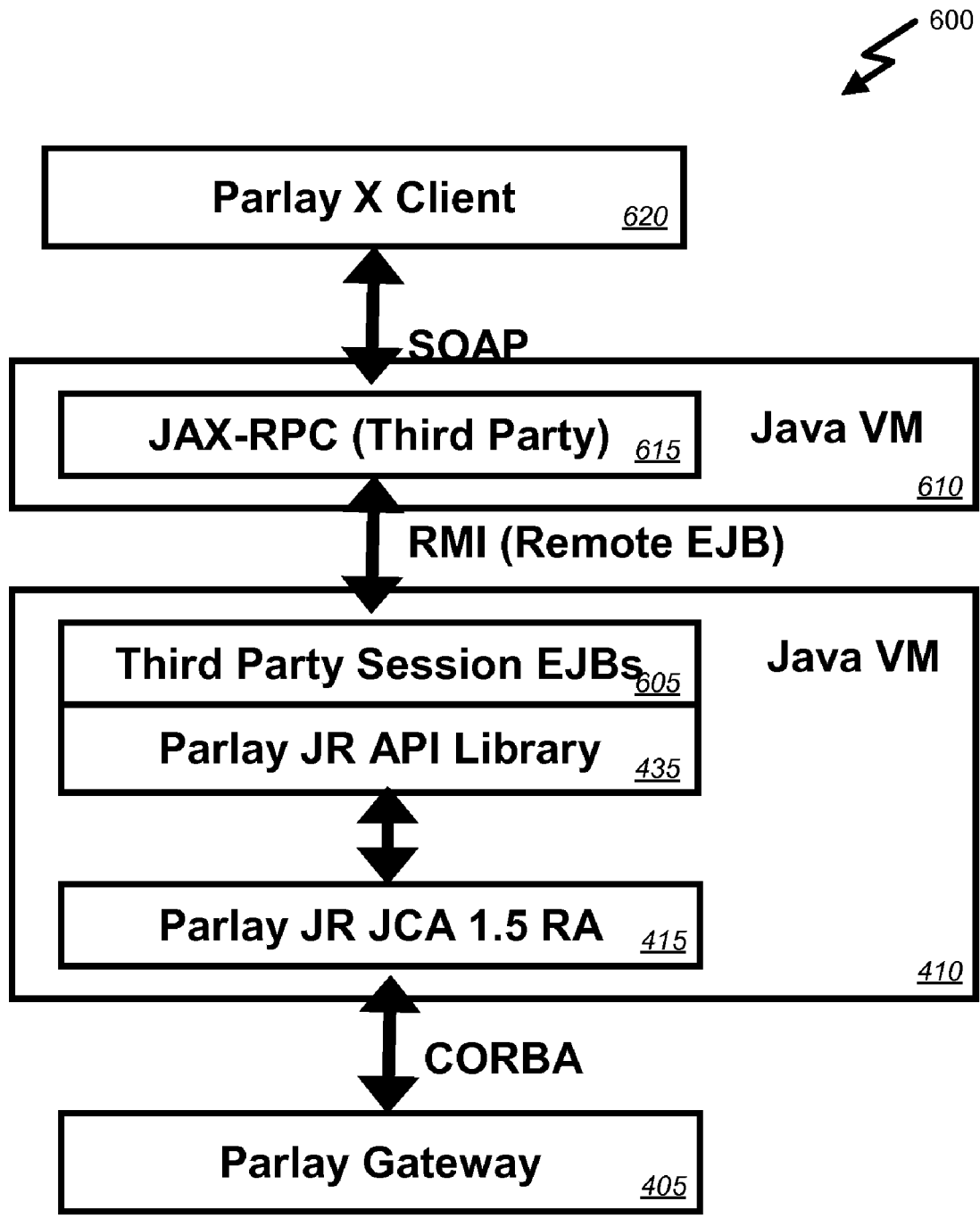
FIG. 6 is a block diagram illustrating an exemplary implementation of the system illustrated in FIG. 4 utilizing a remote application according to one embodiment of the present invention.

FIG. 6 is a block diagram illustrating an exemplary implementation of the system illustrated in FIG. 4 utilizing a remote application according to one embodiment of the present invention. More specifically, this example illustrates a system 600 similar to those described above with reference to FIGS. 3 and 4 but in which a remote application 620 has been implemented. As illustrated here, the system 600 includes a local control module 410 implemented in a Java Virtual Machine. Also as illustrated in this example and described above, the communications network can include a Parlay gateway 405. The resource adapter 415 can comprise a bi-directional resource adapter such as a Parlay Java Rulebook J2EE Connector Architecture (JCA) 1.5 resource adapter and the local API library 435 can comprise a Parlay Java Rulebook API library as described. The resource adapter 415 and the local API library 435 can be implemented using standard Parlay and JCA components also as described.

The remote application 620 can comprise, for example, a Parlay X client application. Additionally, a remote interface 615 can be implemented, for example on a Java Virtual Machine 610. The remote interface 615 can comprise, for example, a Java API for XML-Remote Procedure Calls (JAX-RPC) interface. The remote application 620 can call this interface, for example via a Simple Object Access Protocol (SOAP) message or other protocol message, to in turn access the local application 605 which supports a third party session with the remote application 620. While the remote interface introduces additional delays due to remote nature of distributed protocols, networks, etc. relative to the local implementations described above, the latencies of the local application and interface are maintained as described above.

Figure 7:
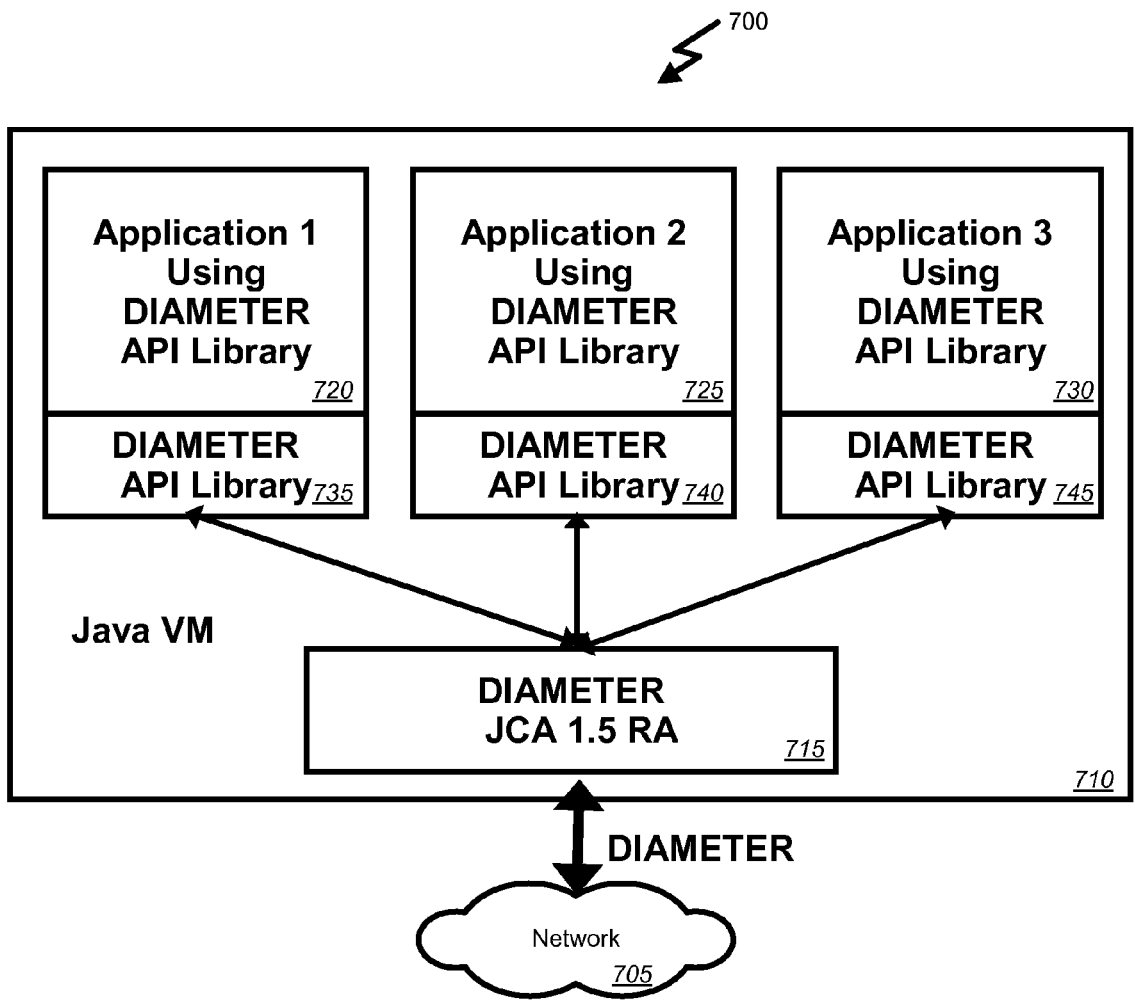
FIG. 7 is a block diagram illustrating an implementation of a system for handling network events and/or requesting network actions according to an alternative embodiment of the present invention.

FIG. 7 is a block diagram illustrating an implementation of a system for handling network events and/or requesting network actions according to an alternative embodiment of the present invention. This example illustrates a system 700 as discussed above with reference to FIG. 3. In this example, the local control module 710 can be implemented in a Java Virtual Machine. Also as illustrated in this example, the communications network 705 can comprise a network 705 utilizing the Diameter protocol. In such a case, the resource adapter 715 can comprise a Diameter Java Rulebook J2EE Connector Architecture (JCA) 1.5 resource adapter and the local API libraries 735-745 can comprise Diameter API libraries. The resource adapter 715 and the local API libraries 735-745 can be implemented using standard Diameter and JCA components as will be illustrated below.

Figure 8:
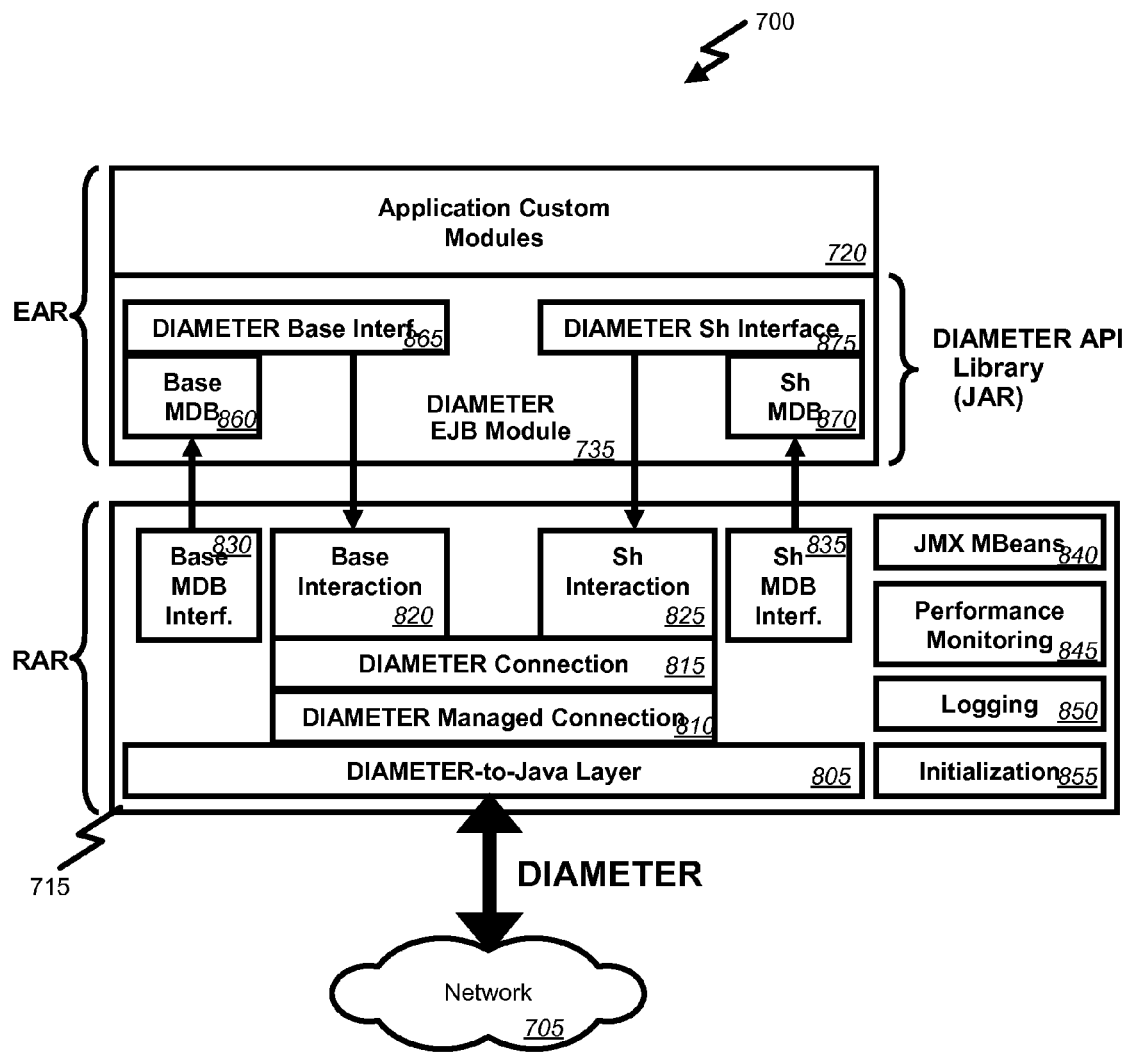
FIG. 8 is a block diagram illustrating additional details of the system illustrated in FIG. 7.

FIG. 8 is a block diagram illustrating additional details of the system illustrated in FIG. 7. That is, the example here illustrates additional details of the system 700 implemented using standard Diameter and JCA components. For example, the resource adapter 715 can be implemented using various standard components including, but not limited to, a Diameter-to-Java layer 805, a Diameter managed connection module 810, and a Diameter connection module 815. The resource adapter 715 can also include a number of interface or interaction modules such as a Diameter base database interface 830, a Diameter base interaction module 820, a Diameter Sh interaction module 825, and a Diameter Sh database interface 835. Additionally, the resource adapter 715 can include Java Management eXtension MBeans 840, a performance monitoring module 845, a logging module 850, and an initialization module 855.

Similarly, the local API library 735 can include standard components as provided as part of the JCA 1.5 and Diameter standards and as can be understood by one skilled in the art. For example, the local API library 735 can include a Diameter base interface 865 and a Diameter base database 860. The local API library 735 can also include a Diameter Sh interface 875 and Diameter Sh database 870. Also, any other Diameter application, i.e., other than Sh, can be built around the base implementation by creating the appropriate interface(s). Utilities or tools for creating such an interface may be provided as part of a Software Development Kit (SDK).

Finally, the local application 720, as discussed above, can include modules for handling network events detected by the resource adapter 715 and passed through the local API library 735 and/or for requesting actions of a network resource via the local API library 735 and resource adapter 715. For example, the local application 720 can provide call control functions via the local API library 735. Additionally or alternatively, the local application 720 can include other types of managers for performing other types of functions including but not limited to media control, providing a web service, etc.

Figure 9:
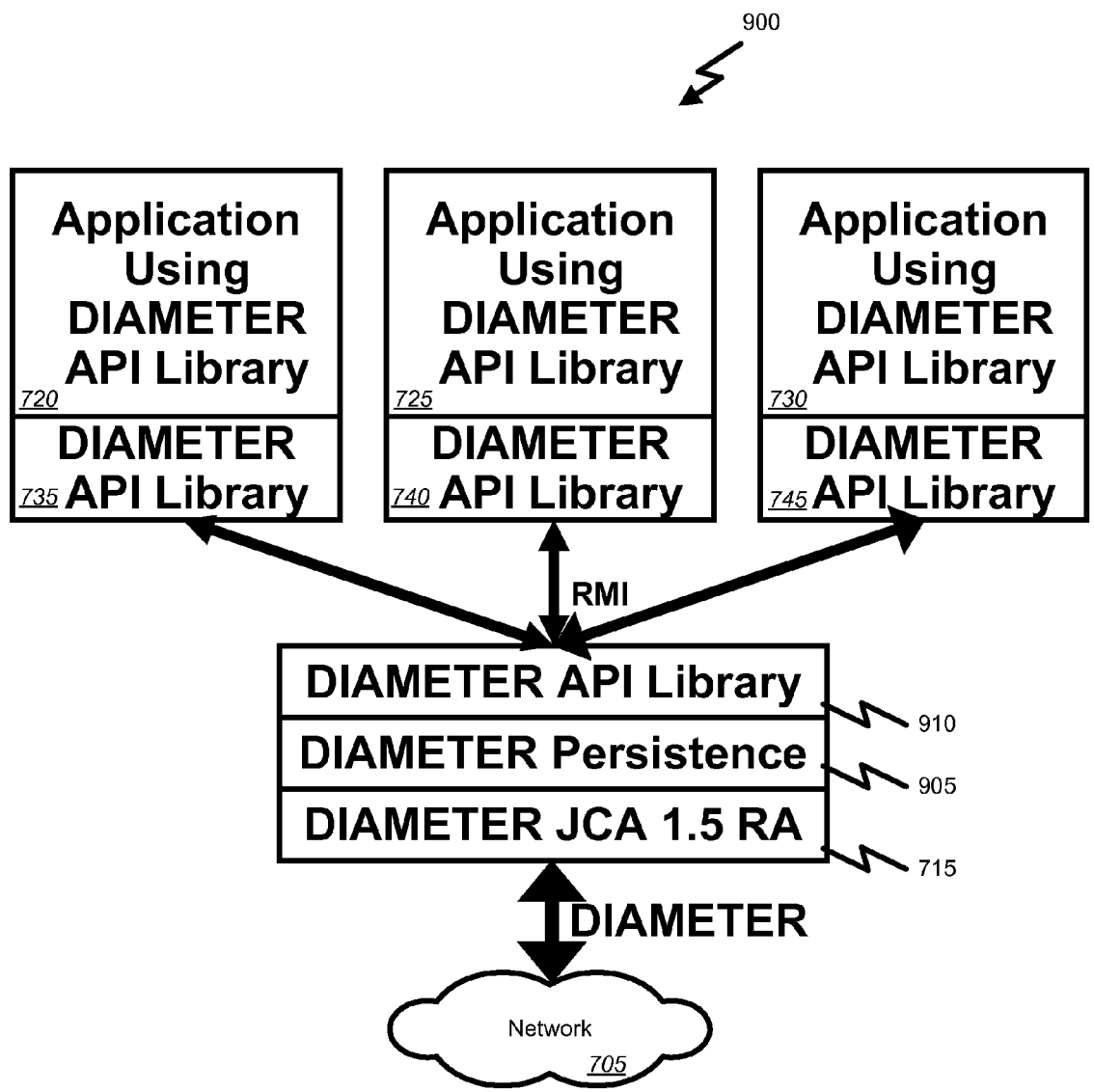
FIG. 9 is a block diagram illustrating an implementation of a system for handling network events and/or requesting network actions according to yet another alternative embodiment of the present invention.

FIG. 9 is a block diagram illustrating an implementation of a system for handling network events and/or requesting network actions according to yet another alternative embodiment of the present invention. This example illustrates a system 900 as discussed above with reference to FIG. 3. In this example, rather than a local control module including the resource adapter and local application implemented in the same Java Virtual Machine such as described above, the resource adapter and 715 and applications 720-730 are remote from each other, i.e., not one the same virtual machine. As illustrated in this example, the communications network 705 can comprise a network 705 utilizing the Diameter protocol. The resource adapter 715 can comprise a Diameter Java Rulebook J2EE Connector Architecture (JCA) 1.5 resource adapter 715 with a Diameter persistence layer 905 and a Diameter API library 910. Additionally, the applications 720-730 can include local API libraries 735-745 that can comprise Diameter API libraries. In this example, the applications 720-730, through the local API libraries 735-745, can invoke the resource adapter via remote method invocation of the Diameter API library 910 of the resource adapter 715. Again, the resource adapter 715 and the local API libraries 735-745 can be implemented using standard Diameter and JCA components as will be illustrated below.

Figure 10:
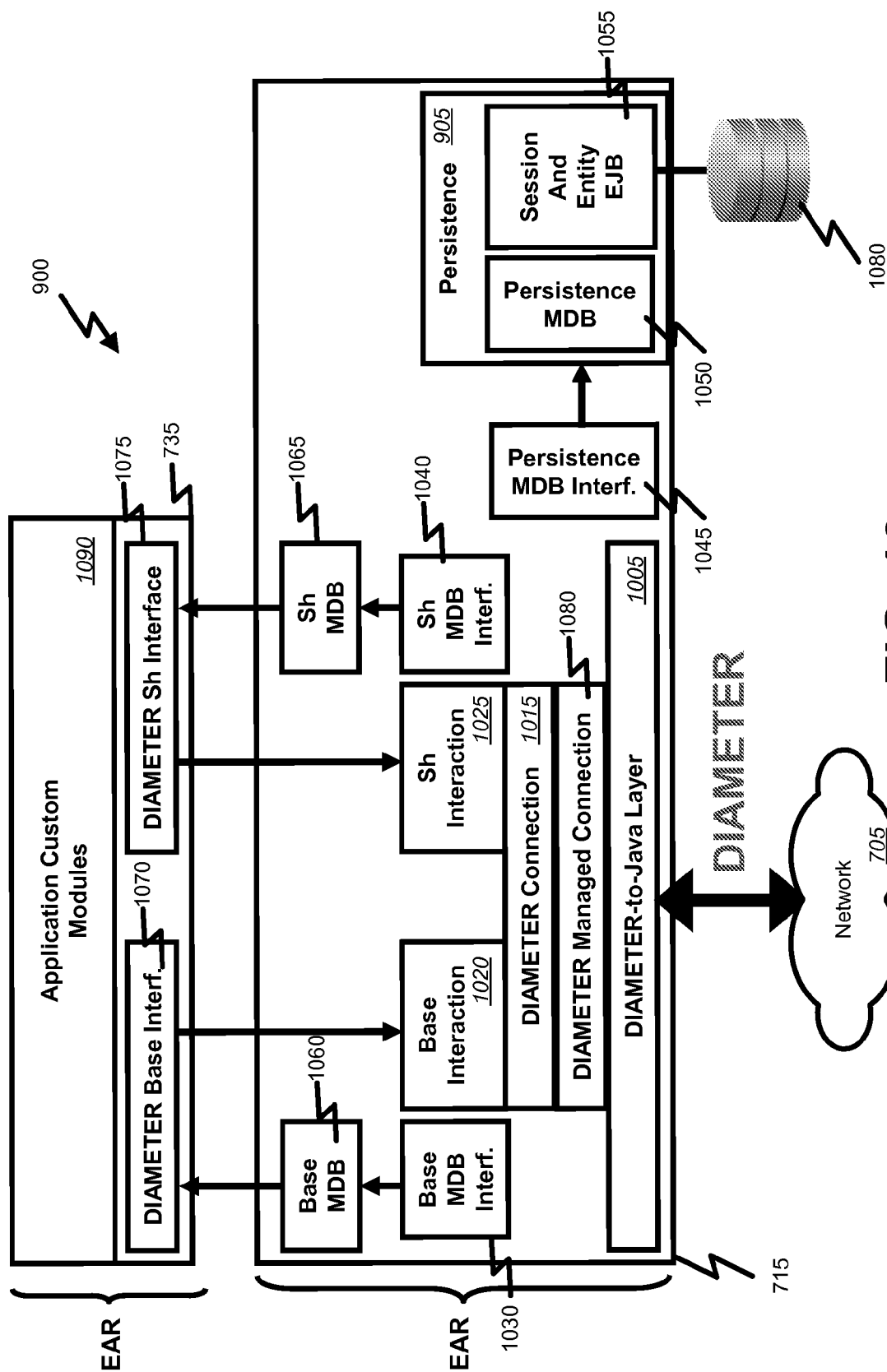
FIG. 10 is a block diagram illustrating additional details of the system illustrated in FIG. 9.

FIG. 10 is a block diagram illustrating additional details of the system illustrated in FIG. 9. That is, the example here illustrates additional details of the system 900 implemented using standard Diameter and JCA components. For example, the resource adapter 715 can be implemented using various standard components including, but not limited to, a Diameter-to-Java layer 1005, a Diameter managed connection module 1080, and a Diameter connection module 1015. The resource adapter 715 can also include a number of interface or interaction modules such as a Diameter base database interface 1030, a Diameter base interaction module 1020, a Diameter Sh interaction module 1025, and a Diameter Sh database interface 1040. Additionally, the resource adapter 715 can include a Diameter base database 1060 and/or a Diameter Sh database 1065. The resource adapter 715 can also include a persistence database interface 1045 for interfacing with a persistence module 9805 including a persistence database 1050 and a session and entity EJB module 1055 for interacting with one or more external data stores 1080 or other resources.

Similarly, the local API library 735 can include standard components as provided as part of the JCA 1.5 and Diameter standards and as can be understood by one skilled in the art. For example, the local API library 735 can include a Diameter base interface 1070. The local API library 735 can also include a Diameter Sh interface 1075.

Finally, the application 735, as discussed above, can include modules for handling network events detected by the resource adapter 715 and/or for requesting actions of a network resource via the resource adapter 715. For example, the local application 735 can include a Diameter base interface 1070 and/or a Diameter Sh interface 1075. The application 735 can also include any number of custom modules 1090 for performing functions such as providing call control media control, web services, etc.

It should be understood that, while described in this example as utilizing a Diameter Sh interface 1075, such an implementation is offered by way of example only and is not intended to limit the scope of the present invention. In other implementations other applications and/or interfaces may be utilized. For example another Diameter application can be built and/or utilized in the same way. That is, if a toolkit is available to define the associated Attribute-Value Pairs (AVPs) of another diameter applications as known in the art, any Diameter application can be built by using and/or mapping the right set of AVPs on the "Diameter adapter".

Figure 11:
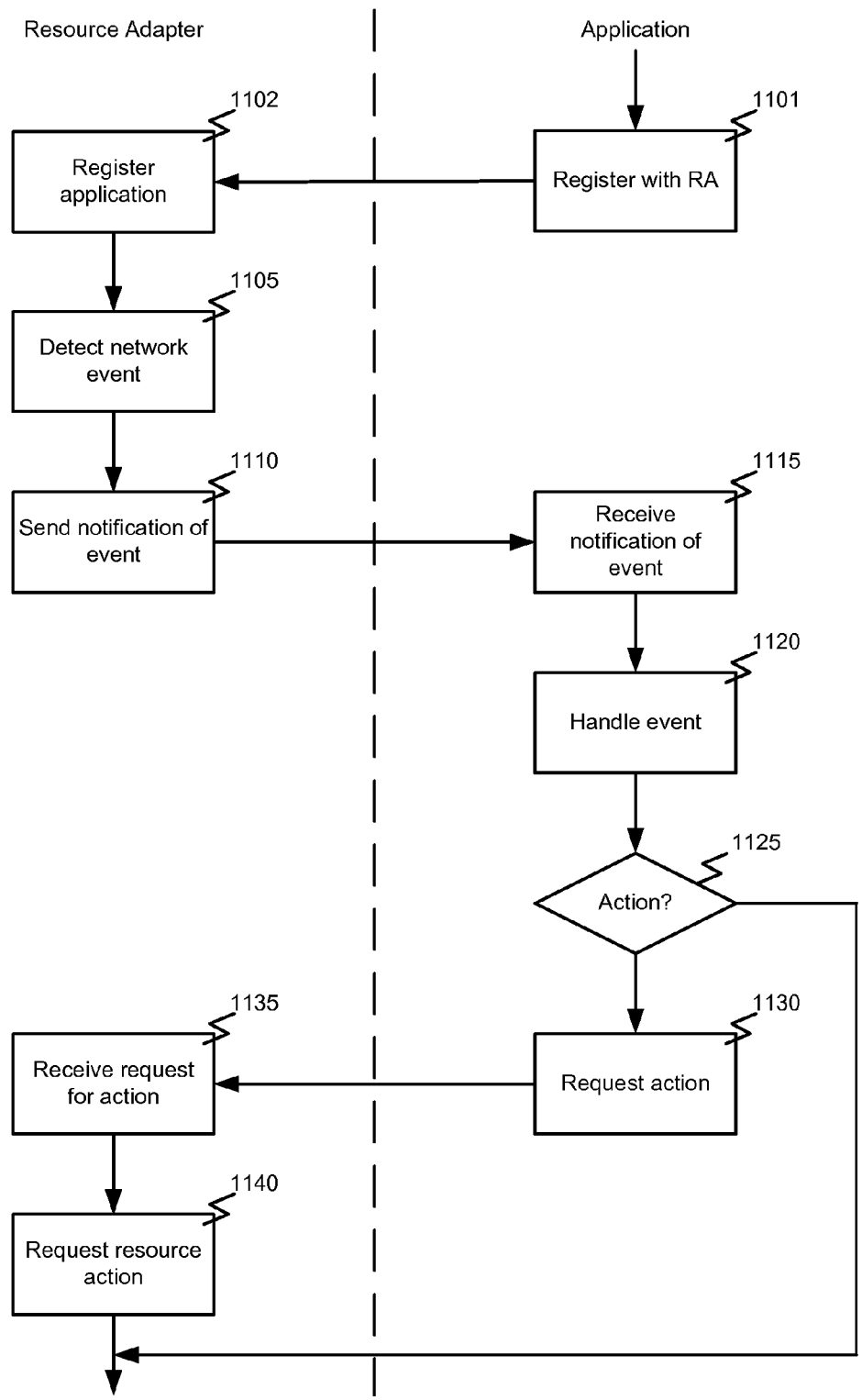
FIG. 11 is a flowchart illustrating a process for handling network events according to one embodiment of the present invention.

FIG. 11 is a flowchart illustrating a process for handling network events according to one embodiment of the present invention. In this example, processing begins with a local application registering 1101 and 1102 with a resource adapter. Registration 1101 and 1102 between the application and resource adapter can be performed in any of a variety of manners known in the art without departing from the scope of the present invention. After registration 1101 and 1102, the resource adapter can detect 1105 a network event on a communications network. An indication of the network event can be sent 1110 from the resource adapter to the registered local application via a local Application Program Interface (API) library of the local application. The local application can then receive 1115 the indication of the event and handle 1120 the network event. For example, handling 1120 the network event with the local application can comprise performing call control, performing multi-party call control, performing media control, providing a web service, or performing other functions.

During or after handling 1120 of the event, a determination 1125 can be made as to whether to request an action of a network resource. In response to determining 1125 to request an action, the action can be requested 1130 via the local API library and the resource adapter. The resource adapter can receive 1135 the request for the action of the network resource from the application via the local API interface and request 1140 the action from the resource over the network. Alternatively, rather than requesting 1130 further action via the local API library and the resource adapter, a notification of the event can be provided to help provide predictable low latencies.

Figure 12:
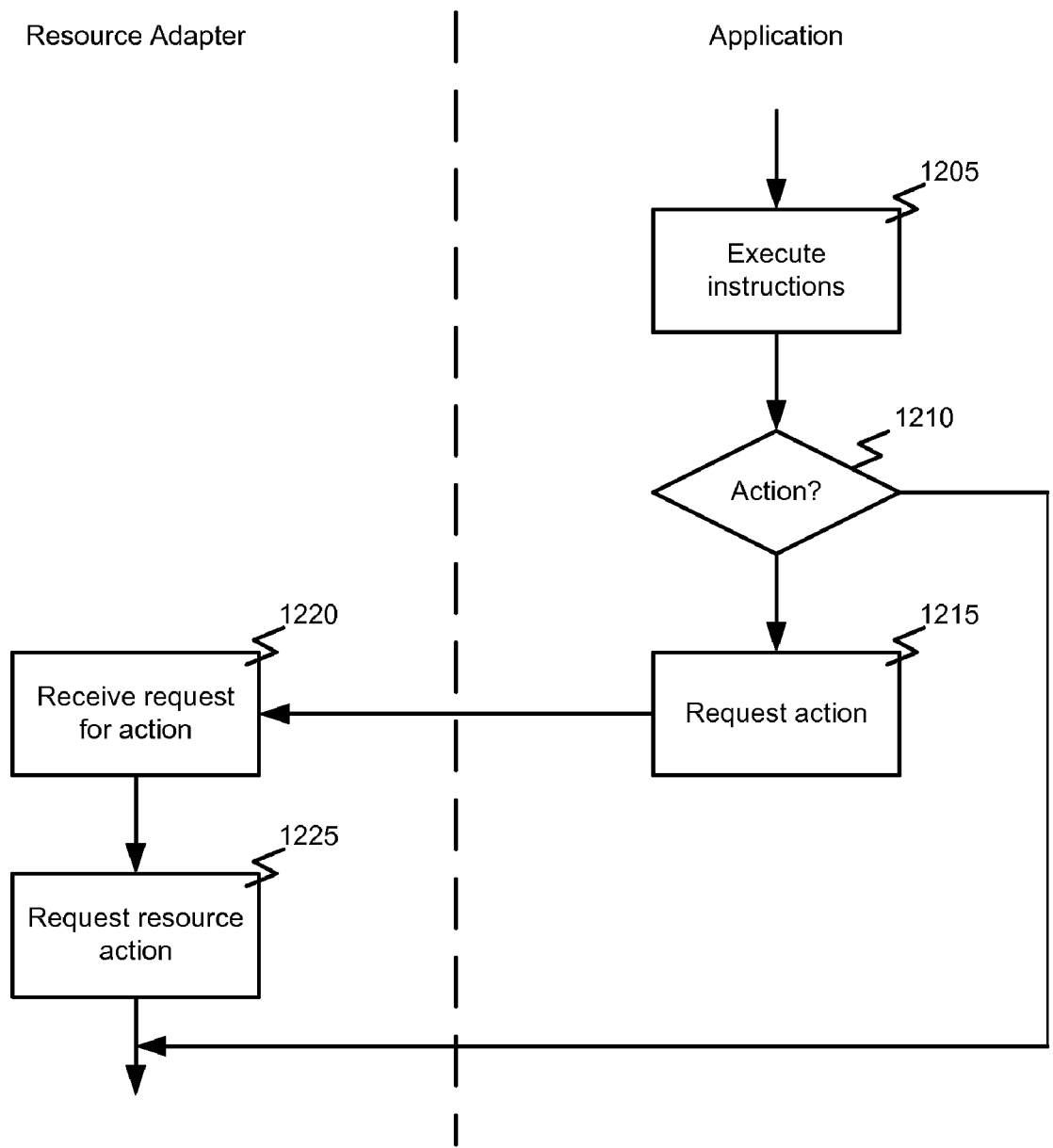
FIG. 12 is a flowchart illustrating a process for requesting actions of network resources according to one embodiment of the present invention.

FIG. 12 is a flowchart illustrating a process for requesting actions of network resources according to one embodiment of the present invention. In this example, rather than reacting to a network event, the application can initiate the action of the network resource. Here, processing begins with the application executing 1205 one or more instructions such as when performing call control, multi-party call control, media control, providing web services, or performing another function.

During or after execution 1205, a determination 1210 can be made as to whether to request an action of a network resource. In response to determining 1210 to request an action, the action can be requested 1215 via the local API library and the resource adapter. The resource adapter can receive 1220 the request for the action of the network resource from the application via the local API interface and request 1225 the action from the resource over the network.

It should be understood that the procedures described herein to achieve low, predictable latencies and high throughput when using non-real time components are not exclusive and can be used in combination with other procedures. For example, when implemented on a Java Virtual Machine, Virtual Machine optimization can be done to minimize the performance impact of routine processes like garbage collection. For example, Java Virtual Machine tuning can be achieved as a manual post-installation configuration change. In such cases, parameters such as JVM parameters (depending on the operating system), thread pool settings, database connection settings, network thread settings, TimesTen data source permanent size settings, etc can be adjusted to achieve such tuning. For example, JVM parameters can be tuned to reduce the length of pauses occurring due to garbage collection. In another example, the relative sizes of the young and tenured generations can be tuned. In yet another example, a concurrent mark and sweep garbage collector (low pause collector) which collects the tenured generation concurrently with the application to avoid long garbage collection pause can be utilized. In still another example, a concurrent mark and sweep collector can be used in an incremental mode which can be adapter to further reduce the length of garbage collection pauses.

If a system such as described herein is implemented on a platform with garbage collection (e.g. JEE), the resource adapters and applications or enablers can be implemented so that the platform (e.g. JVM) can manage the sessions/VM so that the size of the data to process by garbage collection does not grow too big. So for example, in a multithreaded environment, the adapter can manage thread pools, for example via thread pool management facilities provided by JCA 1.5, to ensure that it reduces the amount of threads to clean, etc. That is, in case of a java implementation, a thread pool can be managed by the adapter to provide reuse of threads and reduce the amount of threads to process via garbage collection. Indeed when garbage collection starts, other processing stops. So, the size of application sessions and data in JVM should remain small and distributed across multiple JVMs.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A system for providing low-latency handling of events in a real time environment while utilizing non-real time components, the system comprising:
    an external resource comprising a non-real time component;
    a processor; and
    a memory coupled with and readable by the processor and having stored therein a sequence of instructions which, when executed by the processor, cause the processor to execute at least one resource adapter, the resource adapter interacting with the external resource and at least one local application operating in a real time environment, each local application having a plurality of local interfaces to the resource adapter, wherein each local application interacts with the resource adapter via the local interfaces to interact with the external resource, wherein each local interface for each application is implemented using only local libraries of the local application, and wherein the plurality of local interfaces for each application are divided between a plurality of different functions of the external resource where each of the plurality of local interfaces for each application processes calls to or from a different function of the external resource.

2. The system of claim 1, wherein the resource adapter is adapted to detect events of the external resource and request actions of the external resource.

3. The system of claim 2, wherein the external resource comprises a communication network.

4. The system of claim 3, wherein the communication network further comprises one or more network resources.

5. The system of claim 4, wherein the network resources comprise a Parlay Gateway.

6. The system of claim 5, wherein the resource adapter comprises a Parlay Java Rulebook Connector Architecture (JCA) 1.5 resource adapter.

7. The system of claim 6, wherein the local interfaces comprise Parlay Java Rulebook Application Program Interface (API) libraries.

8. The system of claim 6, wherein the local interfaces comprise Plain Old Java Objects (POJOs).

9. The system of claim 6, wherein the local interfaces comprise Enterprise Java Beans (EJBs).

10. The system of claim 4, wherein the resource adapter comprises a Signaling System 7 (SS7) resource adapter.

11. The system of claim 4, wherein the resource adapter comprises a Customized Applications for Mobile Network Enhanced Logic (CAMEL) resource adapter.

12. The system of claim 4, wherein the resource adapter comprises an Intelligent Network Application Part (INAP) resource adapter.

13. The system of claim 4, wherein the resource adapter comprises a, Transaction Capabilities Application Part (TCAP) resource adapter.

14. The system of claim 3, wherein the local application is adapted to perform call control, wherein the plurality of functions of the external resource includes call control, and wherein one of the plurality of local interfaces for the local application includes a call control interface.

15. The system of claim 14, wherein the local application is adapted to perform multi-party call control, wherein the plurality of functions of the external resource includes multi-party call control, and wherein one of the plurality of local interfaces for the local application includes a multi-party call control interface.

16. The system of claim 15, wherein the local application is adapted to perform media control, wherein the plurality of functions of the external resource includes media control, and wherein one of the plurality of local interfaces for the local application includes a media control interface.

17. The system of claim 16, wherein the local application is adapted to provide a web service, wherein the plurality of functions of the external resource includes web service functions, and wherein one of the plurality of local interfaces for the local application includes a web service interface.

18. The system of claim 2, wherein the external resource comprises an Operation Support System (OSS).

19. The system of claim 2, wherein the external resource comprises an Business Support System (BSS).

20. The system of claim 2, wherein the local applications is adapted to receive an indication of the event from the resource adapter via at least one of the local interfaces.

21. The system of claim 20, wherein the local application is further adapted to react to the event.

22. The system of claim 21, wherein the local application is adapted to react to the event by requesting an action of the external resource via at least one of the local interfaces and the resource adapter.

23. The system of claim 2, wherein the local application is adapted to request an action of the external resource via at least one of the local interfaces and the resource adapter.

24. The system of claim 1, further comprising:
    a remote interface communicatively coupled with the local application; and
    a remote application communicatively coupled with the remote interface, wherein the remote application is adapted to interact with the local application via the remote interface.

25. The system of claim 1, wherein the local interfaces pass data by reference.

26. The system of claim 1, wherein the at least one resource adapters comprise a first resource adapter and a second resource adapter.

27. The system of claim 26, wherein the first resource adapter and second resource adapter manage respective thread pools separately.

28. The system of claim 26, wherein the plurality of local interfaces comprise a first local interface for interacting with the first resource adapter and a second local interface for interacting with the second resource adapter and wherein the local application is adapted to interact with the first resource adapter via the first local interface and the second resource adapter via the second local interface.

29. The system of claim 28, wherein the first resource adapter, second resource adapter, first local interface, and second local interface are adapted to prevent introspection.

30. The system of claim 1, wherein the at least one resource adapter and the plurality of local interfaces are implemented on a Java Virtual Machine (JVM).

31. The system of claim 30, wherein the JVM is tuned to reduce pauses caused by a garbage collection process.

32. The system of claim 30, wherein the JVM utilizes a concurrent mark and sweep garbage collection process.

33. A method for providing low-latency handling of events in a real time environment while utilizing non-real time components, the method comprising:
    detecting an external event of a non-real time component with a resource adapter, the resource adapter providing a plurality of local interfaces to a local application running in a real time environment the plurality of local interfaces implemented using only local libraries of the local application, wherein the plurality of local interfaces are divided between different functions of the external resource, and wherein each of the plurality of local interfaces processes calls to or from a different function of the external resource;
    sending an indication of the external event from the resource adapter to the local application via a local interfaces of the local application for a function related to the external event;
    receiving the indication of the external event from the resource adapter at the local application via the local interface for the function related to the external event; and
    handling the external event with the local application.

34. The method of claim 33, wherein handling the external event with the local application comprises requesting an action of an external resource via at least one of the local interfaces and the resource adapter.

35. The method of claim 34, wherein the external event comprises a network event.

36. The method of claim 35, wherein the function related to the external event comprises a call control function, wherein the local interface for the function related to the external event comprises a call control interface, and wherein handling the external event with the local application comprises performing call control.

37. The method of claim 35, wherein the function related to the external event comprises a multi-party call control function, wherein the local interface for the function related to the external event comprises a multi-party call control interface, and wherein handling the network event with the local application comprises performing multi-party call control.

38. The method of claim 35, wherein the function related to the external event comprises a media control function, wherein the local interface for the function related to the external event comprises a media control interface, and wherein handling the network event with the local application comprises performing media control.

39. The method of claim 35, wherein the function related to the external event comprises a web service function, wherein the local interface for the function related to the external event comprises a web service interface, and wherein handling the network event with the local application comprises providing a web service.

40. A method for requesting actions of resources in a real time environment while utilizing non-real time components, the method comprising:
    sending a request for an action of an external resource comprising a non-real time component from a local application operating in a real time environment via a local interface of a plurality of local interfaces of the local application, wherein each local interface is implemented using only local libraries of the local application, wherein the plurality of local interfaces are divided between different functions of the external resource, wherein each of the plurality of local interfaces processes calls to or from a different function of the external resource, and wherein the request is sent via a local interface of the plurality of local interface that is related to a function to which the action is directed;
    receiving the request for the action of the resource at a resource adapter via the local interface related to the function to which the action is directed; and
    requesting the action of the network resource from the resource adapter.

41. The method of claim 40, wherein the external resource comprises a communication network.

42. The method of claim 41, wherein the request comprises a request for a call control function, wherein the local interface related to the function to which the action is directed comprises a call control interface, and wherein sending the request for the action of the resource from the local application is performed in response to a call control function of the local application.

43. The method of claim 41, wherein the request comprises a request for a multi-party call control function, wherein the local interface related to the function to which the action is directed comprises a multi-party call control interface, and wherein sending the request for the action of the resource from the local application is performed in response to a multi-party call control function of the local application.

44. The method of claim 41, wherein the request comprises a request for a media control function, wherein the local interface related to the function to which the action is directed comprises a media control interface, and wherein sending the request for the action of the resource from the local application is performed in response to a media control function of the local application.

45. The method of claim 41, wherein the request comprises a request for a web service function, wherein the local interface related to the function to which the action is directed comprises a web service interface, and wherein sending the request for the action of the resource from the local application is performed in response to a web service function of the local application.

* * * * *

UNITED STATES PATENT AND TRADEMARK OFFICE
CERTIFICATE OF CORRECTION

| | | |
|---|---|---|
| PATENT NO. | : 8,321,594 B2 | Page 1 of 1 |
| APPLICATION NO. | : 11/951500 | |
| DATED | : November 27, 2012 | |
| INVENTOR(S) | : Maes et al. | |

It is certified that error appears in the above-identified patent and that said Letters Patent is hereby corrected as shown below:

In column 1, line 7-34, delete "The resource....TAPI, etc." and insert -- This application claims the benefit of U.S. Provisional Application No. 60/896,676, filed March 23, 2007 by Maes and entitled "A Call Control Driven MVC Programming Model for Mixing Web and Call or Media Applications," the entire disclosure of which is incorporated herein by reference. --, therefor.

In column 2, line 12, delete "interface" and insert -- interface. --, therefor.

In column 6, line 43, after "may" delete "can".

In column 10, line 14, delete "the a" and insert -- the --, therefor.

In column 11, line 17, delete "manner," and insert -- manner. --, therefor.

In column 16, line 2, in Claim 13, delete "a," and insert -- a --, therefor.

Signed and Sealed this
Nineteenth Day of March, 2013

Teresa Stanek Rea
*Acting Director of the United States Patent and Trademark Office*